United States Patent
Kuroda et al.

[11] Patent Number: 6,076,032
[45] Date of Patent: Jun. 13, 2000

[54] CONTROL SYSTEM FOR VEHICLE FOR CONTROLLING THE DRIVING FORCE DEPENDING ON OPERATING CONDITIONS OF THE VEHICLE

[75] Inventors: Shigetaka Kuroda; Akira Kato; Jun Takahashi; Kazutomo Sawamura; Yoshiharu Saito; Ryuuji Kouno, all of Wako, Japan

[73] Assignee: Honda Giken Kogyo Kabushiki Kaisha, Tokyo, Japan

[21] Appl. No.: 08/842,499

[22] Filed: Apr. 24, 1997

[30] Foreign Application Priority Data

| Apr. 26, 1996 | [JP] | Japan | 8-131411 |
| Apr. 26, 1996 | [JP] | Japan | 8-131412 |
| Apr. 30, 1996 | [JP] | Japan | 8-132771 |

[51] Int. Cl.[7] ............................................ G06F 17/00
[52] U.S. Cl. ........................ 701/54; 701/57; 701/58; 477/97
[58] Field of Search .................... 701/57, 51, 53, 701/54, 58, 65, 66; 477/94, 97, 105

[56] References Cited

U.S. PATENT DOCUMENTS

| 4,514,811 | 4/1985 | Daubenmier et al. ............... 701/58 |
| 4,727,838 | 3/1988 | Oshiage et al. . | |
| 4,862,854 | 9/1989 | Oda et al. ................ 123/399 |
| 4,991,097 | 2/1991 | Fodale et al. ................ 701/54 X |
| 5,345,907 | 9/1994 | Matsuoka ................ 123/399 |
| 5,467,751 | 11/1995 | Kumagai ................ 123/399 |
| 5,477,825 | 12/1995 | Hattori et al. . | |
| 5,483,446 | 1/1996 | Momose et al. ................ 701/1 |

FOREIGN PATENT DOCUMENTS

| 0 561 382 | 9/1993 | European Pat. Off. . |
| 44 12 735 | 10/1994 | Germany . |
| 38 11 541 | 10/1998 | Germany . |
| 63-268943 | 11/1988 | Japan . |
| 3-163256 | 7/1991 | Japan . |

*Primary Examiner*—William A. Cuchlinski, Jr.
*Assistant Examiner*—Edward Pipala
*Attorney, Agent, or Firm*—Armstrong, Westerman, Hattori, McLeland & Naughton

[57] ABSTRACT

A control system for a vehicle calculates a desired driving force required by the vehicle in response to operating conditions of the vehicle including an amount of operation of an accelerator pedal of the vehicle, and controls the driving force of the vehicle, based on the calculated desired driving force. The desired driving force is corrected depending on whether the vehicle is in a particular operating condition. For example, when the vehicle is in a standing condition while traveling on a road congested with traffic when the desired driving force is corrected in the decreasing direction, the correction amount of the desired driving force in the decreasing direction is corrected to a value closer to zero. The desired driving force is also corrected according to a time period over which the particular operating condition continues.

21 Claims, 18 Drawing Sheets

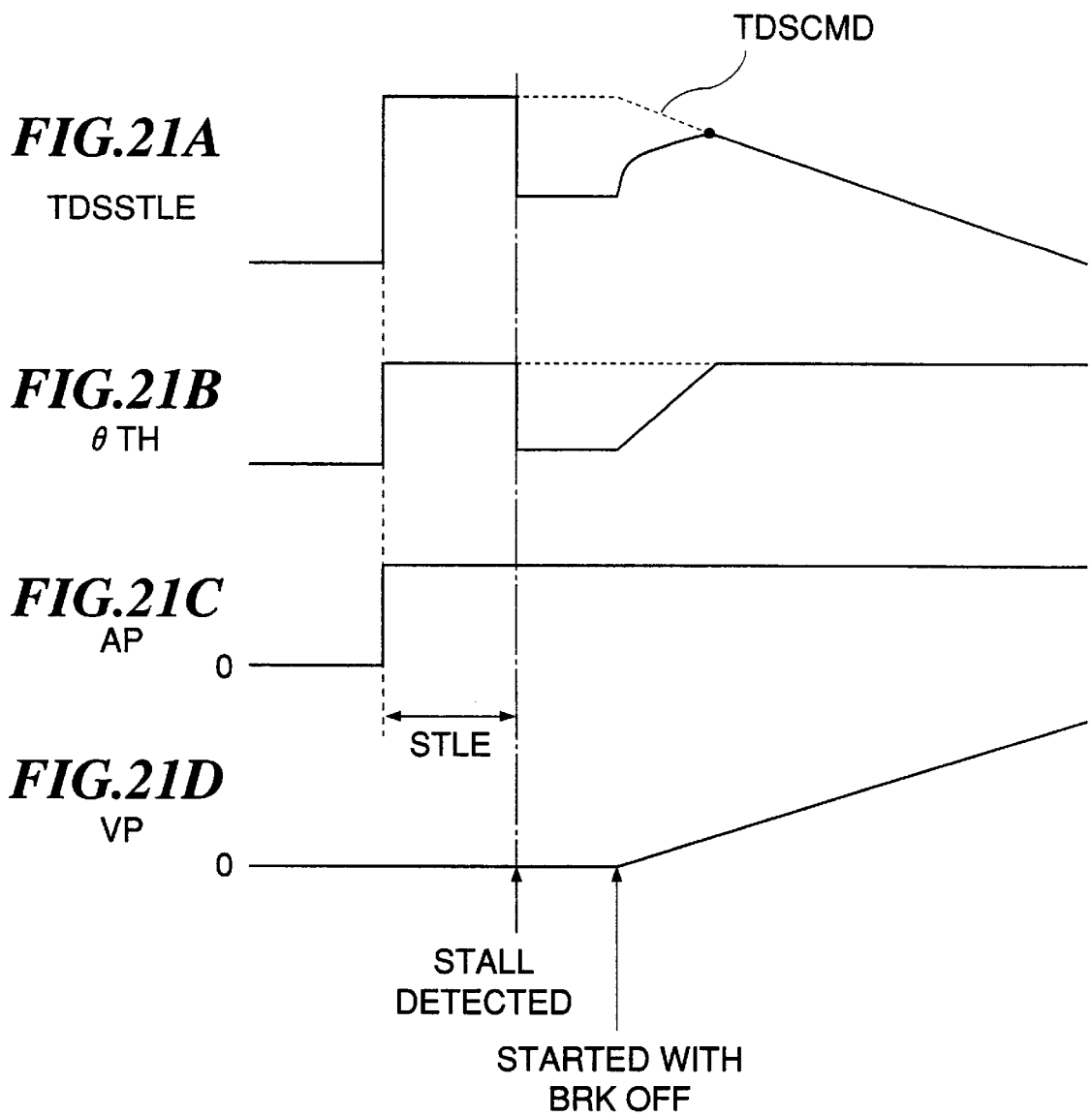

CONTROL SYSTEM FOR VEHICLE FOR CONTROLLING THE DRIVING FORCE DEPENDING ON OPERATING CONDITIONS OF THE VEHICLE

BACKGROUND OF THE INVENTION

1. Field of the Invention

The present invention relates to a control system for vehicles, which calculates a desired driving force required by the vehicle depending on operating conditions of the vehicle, and controls the driving force of the vehicle to the calculated desired driving force.

2. Description of the Related Art

Conventionally, there is known a throttle valve control system which electrically controls the opening of a throttle valve of an internal combustion engine installed in an automotive vehicle, according to a stepping-on amount of an accelerator pedal of the vehicle, e.g. from Japanese Laid-Open Patent Publication (Kokai) No. 63-268943. According to the known control system, when the vehicle is traveling on a street congested with traffic, the gain or change rate of the valve opening of the throttle valve relative to the stepping-on amount of the accelerator pedal is decreased below a normal value so as to improve the drivability during traveling on the congested street.

The known control system, however, does not contemplate the time period over which the vehicle stands in an idle state on a congested street. As a result, if the vehicle stands over a long time period, there occurs a change in the driver's sense of the behavior of the vehicle in response to operation of the accelerator pedal so that the driver feels degraded drivability or insufficient accelerability when he starts the vehicle.

Further, when the vehicle is cruising or traveling at a nearly constant vehicle speed over a long time period, the driver's sense changes so that he feels degraded drivability when he accelerates the vehicle from the cruising state.

On the other hand, there has been conventionally known a control system for vehicles from Japanese Laid-Open Patent Publication (Kokai) No. 3-163256, which calculates by the use of fuzzy inference a desired driving force of the vehicle according to the stepping-on amount of the accelerator pedal and the vehicle speed, and controls the gear position of an automatic transmission of the vehicle and the valve opening of a throttle valve of an internal combustion engine which drives the vehicle so that the driving force of the vehicle becomes equal to the calculated desired driving force.

This known control system, however, changes the gear position of the automatic transmission according to the desired driving force, and as a result, the gear position is frequently changed (so-called shift-busy state), which can degrade the drivability.

On the other hand, in an automotive vehicle with an internal combustion engine with an automatic transmission installed therein, when the vehicle is in a so-called stall state, i.e., an operating condition in which the shift position of the automatic transmission is selected to a traveling position other than a neutral (N) position or a parking (P) position, the vehicle speed is zero, the vehicle is braked, and at the same time the engine rotational speed is higher than a predetermined speed with the accelerator pedal stepped on, the rotational speed ratio between the output shaft and input shaft of the automatic transmission is zero (the output shaft rotational speed is zero) with the difference in rotational speed between the output and input shafts being absorbed by a torque converter of the automatic transmission. On this occasion, almost the entire energy from the engine is converted to heat generated by the torque converter.

If such a stall state lasts over a long time period, component parts of the automatic transmission can be damaged by heat radiated from the torque converter. To protect the automatic transmission, therefore, conventionally the output torque from the engine is reduced to decrease the engine rotational speed by means of fuel cut (interruption of the fuel supply to the engine) or retarding the ignition timing to thereby reduce the amount of heat generated by the torque converter.

However, if fuel cut is employed to reduce the engine output torque for protection of the automatic transmission when the vehicle is in a stall state, exhaust gases from the engine become lean so that the exhaust gas temperature abnormally rises, which can damage a catalytic converter arranged in the exhaust pipe. Further, if the ignition timing is retarded, there can occur irregular combustion within the engine so that unburnt fuel gas is emitted from the engine and delivered to the catalytic converter wherein it can be fired.

SUMMARY OF THE INVENTION

It is a first object of the invention to provide a control system for a vehicle, which is capable of properly controlling the driving force of the vehicle depending upon whether the vehicle is in a particular operating condition, to thereby improve the drivability.

A second object of the invention is to provide a control system for a vehicle, which is capable of improving the drivability when the vehicle leaves a particular operating condition after it has been maintained in the same operating condition.

A third object of the invention is to provide a control system for a vehicle, which is capable of properly setting the desired driving force of the vehicle and controlling the speed reduction ratio of the automatic transmission, to thereby improve the drivability.

A fourth object of the invention is to provide a control system for a vehicle, which is capable of reducing the output torque from the engine for protection of the automatic transmission in a stall state, without impairing the catalytic converter due to irregular combustion of the engine or the like.

To attain the above objects, the present invention provides a control system for a vehicle, the control system having operating means operatable by a driver of the vehicle, for controlling a driving force of the vehicle, desired driving force-calculating means for calculating a desired driving force required by the vehicle in response to operating conditions of the vehicle including an amount of operation of the operating means, and driving force control means for controlling the driving force of the vehicle, based on the calculated desired driving force.

The control system according to the invention comprises:
particular operating condition-detecting means for detecting a particular operating condition in which the vehicle is operating; and
desired driving force-correcting means responsive to an output from the particular operating condition-detecting means, for correcting the desired driving force.

Preferably, to attain the second object, the control system includes measuring means for measuring a time period over which the particular operating condition of the vehicle continues, and wherein the desired driving force-correcting means corrects the desired driving force according to the time period measured by the measuring means.

Preferably, the desired driving force-correcting means terminates the correction of the desired driving force when the vehicle leaves the particular operating condition.

The particular operating condition of the vehicle is typically a standing condition of the vehicle.

Preferably, the desired driving force-calculating means includes traffic congestion-traveling detecting means for detecting whether the vehicle is traveling on a road congested with traffic, and traffic congestion-dependent correction means for correcting the desired driving force in a direction of decreasing same when the traffic congestion-traveling-detecting means detects that the vehicle is traveling on the road congested with traffic. The desired driving force-correcting means corrects a correction amount by which the traffic congestion-dependent correction means corrects the desired driving force in the decreasing direction to a value closer to zero.

More preferably, the desired driving force-correcting means corrects the desired driving force to a larger value as a time period over which the standing condition continues is longer.

Also preferably, the particular operating condition of the vehicle includes at least one of a cruising condition of the vehicle and an accelerating condition of the vehicle in which the vehicle is accelerated to a degree corresponding to a degree of accelerating intention of the driver.

In this case, it is advantageous that the desired driving force-calculating means includes high speed degree-detecting means for detecting a degree to which traveling speed of the vehicle is high, and high speed degree-dependent correction means for correcting the desired driving force in a direction of increasing same, according to the degree detected by the high speed degree-detecting means, and the desired driving force-correcting means corrects a correction amount by which the high speed degree-dependent correction means corrects the desired driving force in the increasing direction to a value closer to zero.

More preferably, the desired driving force-correcting means corrects the desired driving force to a smaller value as a time period over which the cruising condition continues is longer.

Also preferably, the desired driving force-correcting means corrects the desired driving force to a larger value as the degree of accelerating intention of the driver is higher.

To attain the third object, the control system includes:
speed reduction ratio control means for controlling a speed reduction ratio of an automatic transmission of the vehicle according to the amount of operation of the operating means and traveling speed of the vehicle;
first desired driving force-changing means for changing the desired driving force by changing a kind or value of at least one parameter used in control of the speed reduction ratio by the speed reduction ratio control means; and
second driving force-changing means for changing the desired driving force by changing a kind or value of at least one parameter not affecting the control of the speed reduction ratio by the speed reduction ratio control means;
the first desired driving force-changing means or the second desired driving force-changing means changing the desired driving force in response to the output from the particular operating condition-detecting means.

Preferably, the first desired driving force-changing means changes the desired driving force in a direction of decreasing same.

Also preferably, the second desired driving force-changing means includes at least one of high speed degree-dependent changing means for changing the desired driving force according to a degree to which traveling speed of the vehicle is high, and slope traveling-dependent changing means for changing the desired driving force according to a gradient of a slope on which the vehicle is traveling.

To attain the fourth object, according to a second aspect of the invention, there is provided a control system for a vehicle having an internal combustion engine installed therein, the control system having operating means operatable by a driver of the vehicle, for controlling a driving force of the vehicle, desired driving force-calculating means for calculating a desired driving force required by the vehicle in response to operating conditions of the vehicle including an amount of operation of the operating means, and output torque control means for controlling output torque from the engine to a desired output torque based on the calculated desired driving force.

The control system according to the second aspect comprises:
particular operating condition-detecting means for detecting a particular operating condition in which the vehicle is operating; and
desired torque-setting means responsive to an output from the particular operating condition-detecting means, for setting the desired output torque to a value for decreasing rotational speed of the engine to a predetermined value.

Preferably, the particular operating condition of the vehicle is a predetermined stall state of the vehicle.

Specifically, the predetermined stall state of the vehicle is a condition that a state in which the traveling speed of the vehicle is zero, a brake system of the vehicle is operated, an accelerator pedal of the vehicle is stepped on, the rotational speed of the engine exceeds a predetermined value, and at the same time an automatic transmission of the vehicle has a shift position thereof set to a position other than a position for standing of the vehicle, has continued over a predetermined time period. Preferably, the desired output torque-setting means sets the desired output torque to a value corresponding to an amount of stepping-on of the accelerator pedal.

More preferably, the desired output torque-setting means sets the desired output torque to a value for holding the rotational speed of the engine at a predetermined idling speed corresponding to the amount of stepping-on of the accelerator pedal.

Preferably, if an operation of starting the vehicle is carried out during control of the output torque by the output torque control means when the vehicle is in the predetermined stall state, the output torque control means terminates the control of the output torque and controls an amount of intake air supplied to the engine to a value required by the driver.

The above and other objects, features, and advantages of the invention will become more apparent from the following detailed description taken in conjunction with the accompanying drawings.

BRIEF DESCRIPTION OF THE DRAWINGS

FIGS. 21A to 21D collectively form a timing chart showing changes in parameters obtained by the engine output control of FIG. 16.

DETAILED DESCRIPTION OF THE PREFERRED EMBODIMENT

The present will now be described in detail with reference to the drawings showing embodiments thereof.

Figure 1:
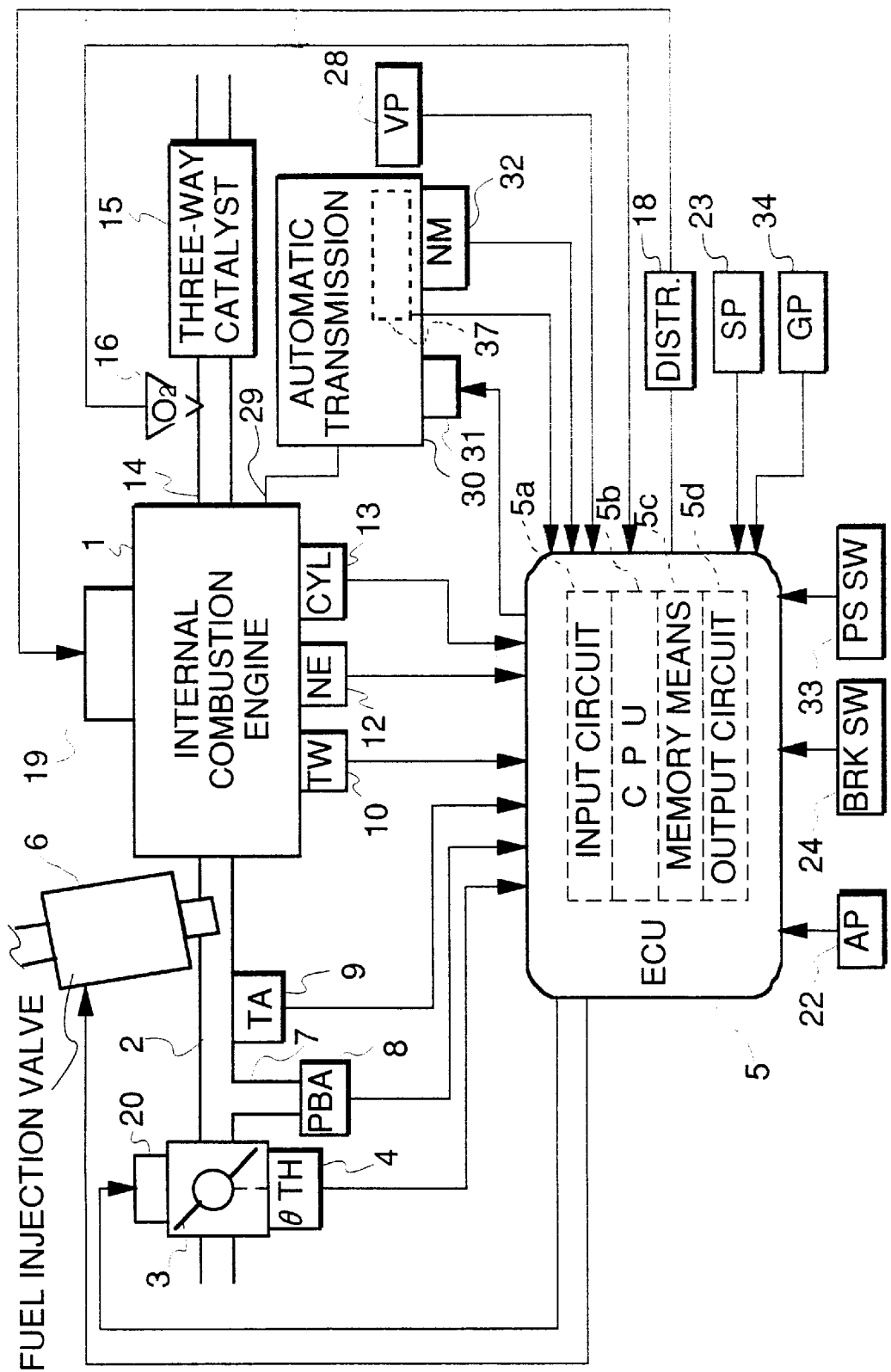
FIG. 1 is a block diagram schematically showing the arrangement of an internal combustion engine installed in an automotive vehicle and a control system for the vehicle according to a first embodiment of the invention.

Referring first to FIG. 1, there is illustrated the arrangement of an internal combustion engine installed in an automotive vehicle and a control system for the vehicle, according to a first preferred embodiment of the invention.

In the figure, reference numeral 1 designates an internal combustion engine for an automotive vehicle, which has a cylinder block to which is connected an intake pipe 2. A throttle valve 3 is arranged in the intake pipe 2, and mechanically coupled to a throttle actuator 20 formed, e.g. of an electric motor to be driven thereby. The throttle actuator is electrically connected to an electronic control unit (hereinafter referred to as "the ECU") 5 which drives the throttle actuator 20 to control the valve opening of the throttle valve 3. A throttle valve opening ($\theta$TH) sensor 4 is connected to the throttle valve 3 and electrically connected to the ECU" 5, for generating an electric signal indicative of the sensed throttle valve opening $\theta$TH to the ECU 5.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

An engine rotational speed (NE) sensor 12 and a cylinder-discriminating sensor (hereinafter referred to as "the CYL sensor") 13 are arranged in facing relation to a camshaft or a crankshaft of the engine 1, neither of which is shown. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CYL sensor 13 generates a signal pulse (hereinafter referred to as "a CYL signal pulse") at a predetermined crank angle of a particular cylinder of the engine 1. The TDC signal pulse and the CYL signal pulse are supplied to the ECU 5.

A spark plug 15 is provided in each cylinder of the engine 1, which is electrically connected to the ECU 5 via a distributor 18 to have ignition timing thereof controlled by a control signal from the ECU 5.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5.

Further, an automatic transmission 30 which is a 4-speed type is connected to an output shaft 29 of the engine 1. The automatic transmission 30 is provided with a shift position (SP) sensor 23 for detecting the position of a shift lever, (not shown), of the automatic transmission, which selects the operating mode of the automatic transmission 30, and a gear position (GP) sensor 34 for detecting the gear position (gear ratio) of the automatic transmission. These sensors 23 and 34 supply signals indicative of the detected shift position SP and gear position GP to the ECU 5. Further, the automatic transmission 30 is provided with a vehicle speed (VP) sensor 28 which is formed by a speedometer cable and detects the traveling speed of the vehicle from the rotational speed of an output shaft, not shown, of the automatic transmission 30, and an output shaft rotational speed (NM) sensor 32 which detects the rotational speed NM of an output shaft of a torque converter, not shown, of the automatic transmission. These sensors 28 and 32 supply signals indicative of the detected vehicle speed VP and output shaft rotational speed NM to the ECU 5.

Further electrically connected to the ECU 5 are an accelerator pedal position (AP) sensor 22 for detecting a stepping-on amount (hereinafter referred to as "the accelerator pedal position AP" or "the accelerator pedal opening AP") of an accelerator pedal, (not shown) of the vehicle and a brake switch (BRK SW) 24 for detecting the operation of a brake system, (not shown), of the vehicle. These sensors 22 and 24 supply signals indicative of the detected accelerator pedal position AP and the operative state of the brake system to the ECU 5. The ECU 5 controls the valve opening of the throttle valve 3 in response to the accelerator pedal position AP, etc. That is, in the illustrated embodiment, the accelerator pedal and the throttle valve 3 are not mechanically connected to each other, but the throttle valve opening θTH is controlled in response to the accelerator pedal position AP and other operating parameters.

Further electrically connected to the ECU 5 is a power steering switch 33 which turns on or off in response to an operating amount of a power steering system, (not shown), of the vehicle, and supplies a signal indicative of its on/off position to the ECU 5. The power steering switch turns on when a steering wheel of the vehicle is turned through approximately 90 degrees or more, turns off if the steering wheel is held at a certain angle, and again turns on if the steering wheel is returned to a position for making the vehicle move straight.

Further electrically connected to the ECU 5 is a gear shifting actuator 31 for changing the gear position GP of the automatic transmission 30.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU") 5b, a memory circuit 5c storing various operational programs which are executed by the CPU 5b, and for storing results of calculations therefrom, etc., and an output circuit 5d which supplies driving signals to the fuel injection valves 6, the spark plugs 19, the throttle actuator 20, and the gear shifting actuator 31.

The CPU 5b of the ECU 5 calculates a final desired engine output torque TENGCMDM required by the vehicle, based on output signals from various sensors and switches, and calculates a desired valve opening of the throttle valve 3 so that output torque from the engine becomes equal to the calculated final desired engine output torque TENGCMDM. Then, the ECU 5 controls the throttle actuator 20 so that the valve opening of the throttle valve 3 becomes equal to the calculated desired valve opening. Further, the ECU 5 calculates the gear position GP of the automatic transmission 30, based on the vehicle speed VP and the accelerator pedal position AP, and thereby controls the gear-shifting actuator 31.

Figure 2:
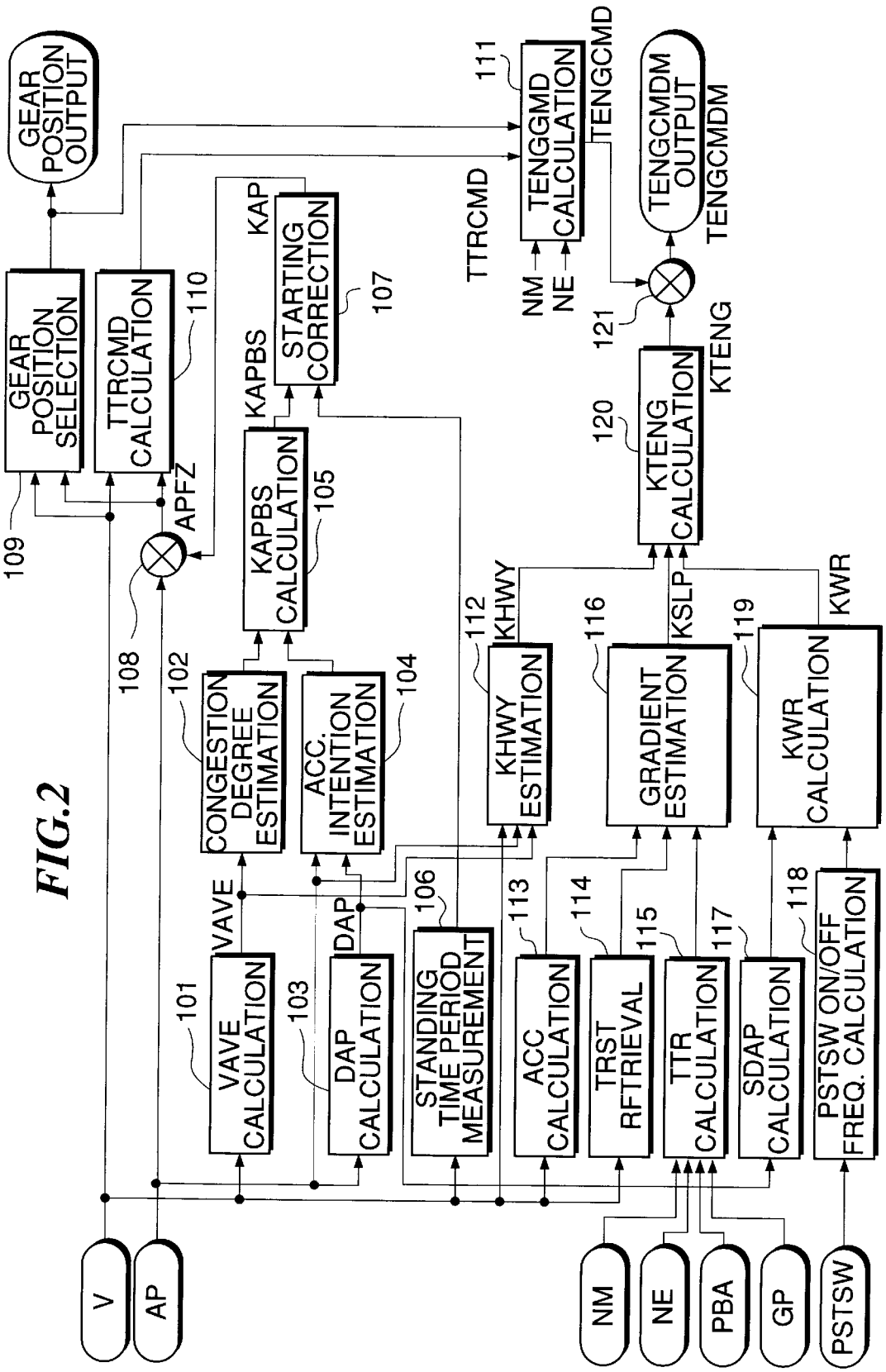
FIG. 2 is a block diagram showing functions performed by a section of the control system for calculating desired engine output torque.

FIG. 2 shows functions performed by a section of the control system for calculating a gear-shifting command value SFTCMD and the final desired engine torque TENGCMDM, based on the accelerator pedal position AP, the vehicle speed VP, the engine rotational speed NE, the intake pipe absolute pressure PBA, the gear position GP, and an on/off signal PSTSW from the power steering switch 33. The illustrated functions are realized by calculation processing carried out by the CPU 5b of the ECU 5.

At block 101, the sensed vehicle speed VP value is smoothed to obtain an average vehicle speed value VAVE, which is input to blocks 102 and 112. At block 103, an amount of change in the accelerator pedal position AP (hereinafter referred to as "the accelerator pedal speed") DAP is calculated by deducting a value of the accelerator pedal position AP detected 5 sampling periods (one sampling period is 20 msec, for example) earlier from a present value of the same, and the calculated accelerator pedal speed DAP is input to blocks 104 and 117.

Figure 3A:
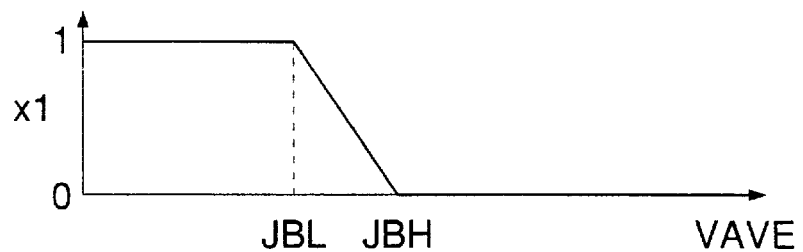
FIGS. 3A to 3C show tables for determining membership functions for use in estimating a degree of congestion.
Figure 3B:
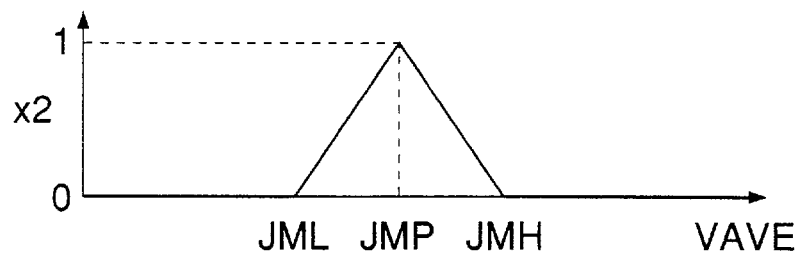
Figure 3C:
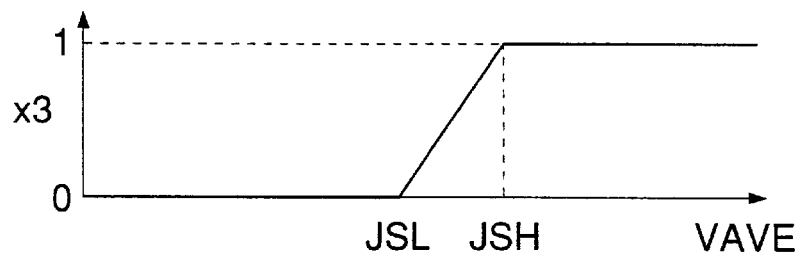

At block 102, a degree of traffic congestion of a street on which the vehicle is traveling is estimated. More specifically, tables shown in FIGS. 3A to 3C are retrieved to determine membership functions, i.e., a membership value x1 for estimating that the congestion degree is high, a membership value x2 for estimating that the congestion degree is medium, and a membership value x3 for estimating that the congestion degree is low. In FIG. 3A, predetermined average speed values JBL and JBH are set, e.g., to 10 km/h and 40 km/h, respectively. In FIG. 3B, predetermined average speed values JML, JMP and JMH are set, e.g. to 10 km/h, 40 km/h and and 80 km/h, respectively. In FIG. 3C, predetermined average speed values JSL and JSH are set, e.g., to 40 km/h and 80 km/h, respectively.

The membership values x1, x2 and x3 calculated at block 102 are input to a block 105.

Figure 4A:
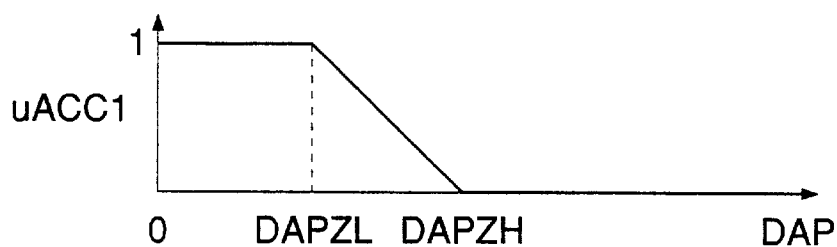
FIGS. 4A to 4D show tables for determining membership functions for use in estimating the driver's intention to accelerate the vehicle.
Figure 4B:
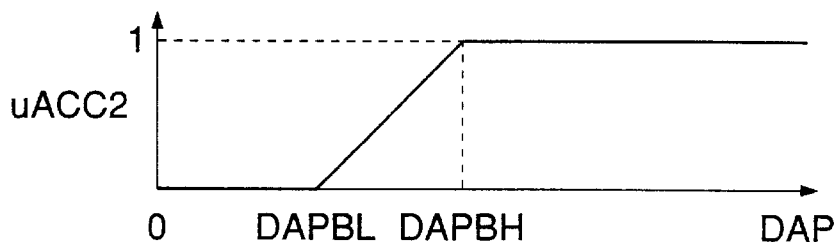

Block 104 estimates the driver's intention to accelerate the vehicle, based on the accelerator pedal position AP and the change rate or accelerator pedal speed DAP thereof. More specifically, membership values y1, y2 and y3 for estimating the driver's intention to accelerate the vehicle are determined in the following manner and the determined membership values are input to the block 105:

1) Tables shown in FIGS. 4A and 4B are retrieved according to the change rate DAP in the accelerator pedal position AP to obtain a DAP-dependent membership value uACC1 for estimating that the driver's accelerating intention is zero, and a DAP-dependent membership value uACC2 for estimating that the driver's accelerating intention is large. In FIG. 4A, predetermined change rate DAP values DAPZL and DAPZH are set, e.g., to 0.25 degrees and 2 degrees, respectively, and in FIG. 4B, predetermined change rate DAP values DAPBL and DAPBH are set, e.g., to 0.25 degrees and 2 degrees, respectively.

Figure 4C:
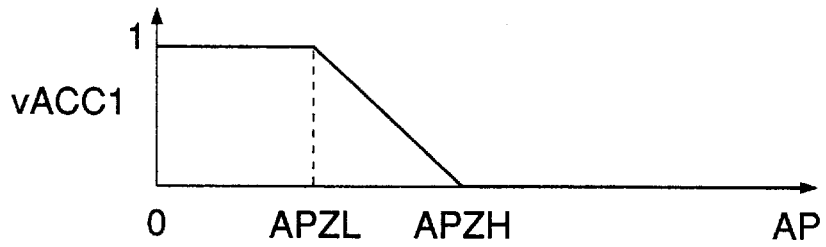
Figure 4D:
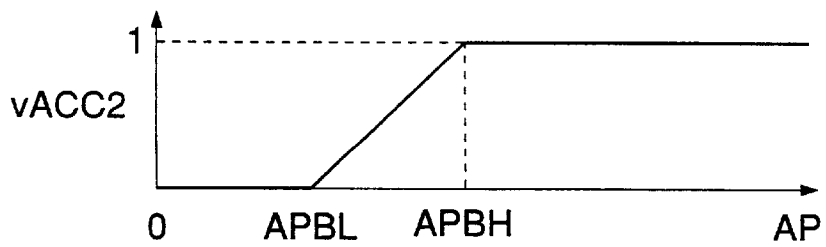

2) Tables shown in FIGS. 4C and 4D are retrieved according to the accelerator pedal position AP to obtain an AP-dependent membership value vACC1 for estimating that the driver's accelerating intention is zero, and an AP-dependent membership value vACC2 for estimating that the driver's accelerating intention is large. In FIG. 4C, predetermined AP values APZL and APZH are set, e.g. to 10 degrees and 60 degrees, respectively, and in FIG. 4D, predetermined AP values APBL and APBH are set, e.g. to 10 degrees and 60 degrees, respectively.

3) The calculated membership values uACC1, uACC2, vACC1 and vACC2 are applied to the following equation (1) to calculate an estimated driver's accelerating intention value ACCM:

$$ACCM=(uACC1 \times vACC1 \times wACC11+uACC1 \times vACC2 \times wACC12+ uACC2 \times vACC1 \times wACC2+uACC2 \times vACC2 \times wACC22)/ (uACC1 \times vACC1+uACC1 \times vACC2+uACC2 \times vACC1+uACC2 \times vACC2) \quad (1)$$

where wACC11, wACC12, wACC21 and wACC22 represent estimated output values obtained from estimated output maps, not shown. wACC11 represents an estimated output value applied when the driver's accelerating intention based on the DAP value is zero and at the same time the driver's accelerating intention based on the AP value is zero; wACC12 represents an estimated output value applied when the driver's accelerating intention based on the DAP value is zero and at the same time the driver's accelerating intention based on the AP value is large; wACC21 represents represents an estimated output value applied when the driver's accelerating intention based on the DAP value is large and at the same time the driver's accelerating intention based on the AP value is zero; and wACC2 an estimated output value applied when the driver's accelerating intention based on the DAP value is large and at the same time the driver's accelerating intention based on the AP value is large. These estimated output values are set as follows, for example: wACC11=−0.025, wACC12=0.1, wACC21=0.2, and wACC22=0.5.

4) A cumulative value ACCSUM of the estimated driver's accelerating intention value ACCM is calculated by the use of the following equation (2):

$$ACCSUM(n)=ACCSUM(n-1)+ACCM \quad (2)$$

where (n) and (n−1) represent that the values with these suffices are a present value and a last value, respectively. This will also apply to values given hereinafter.

Figure 5A:
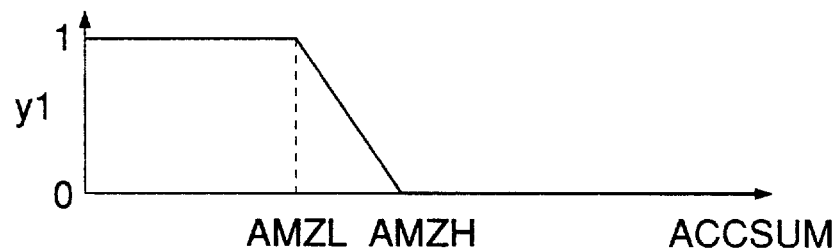
FIGS. 5A to 5C show tables for determining membership functions for use in estimating the driver's intention to accelerate the vehicle.
Figure 5B:
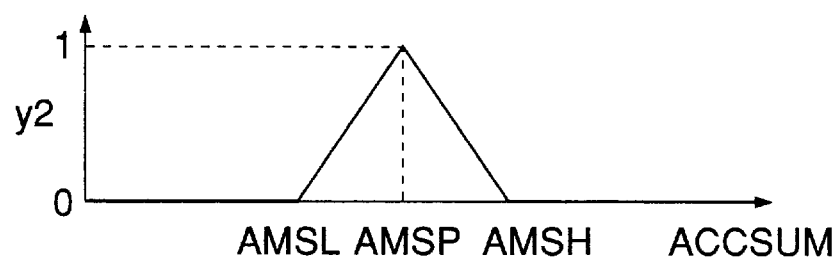
Figure 5C:
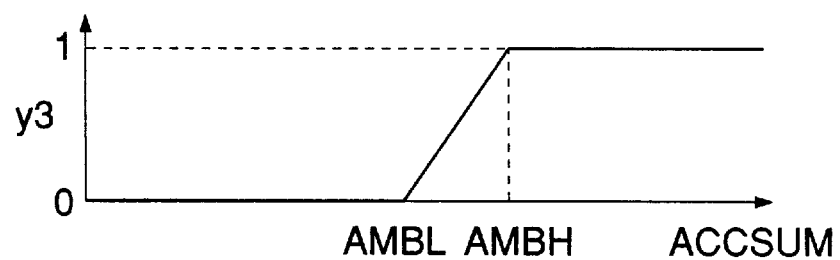

5) Tables shown in FIGS. 5A to 5C are retrieved according to the cumulative value ACCSUM to determine the membership value y1 for estimating that the driver's accelerating intention is zero, the membership value y2 for estimating that the driver's accelerating intention is small, and the membership value y3 for estimating that the driver's accelerating intention is large. In FIG. 5A, predetermined ACCSUM values AMZL and AMZH are set, e.g. to 0.5 and 1.0, respectively. In FIG. 5B, predetermined ACCSUM values AMSL, AMSP and AMSH are set, e.g. to 0.5, 1.0 and 1.5, respectively, and in FIG. 5C, predetermined ACCSUM values AMBL and AMBH are set, e.g. to 1.0 and 1.5, respectively.

Referring again to FIG. 2, at the block 105, a basic accelerator pedal position-dependent correction coefficient KAPBS is calculated by the use of the following equation (3) and the calculated coefficient is input to a block 107:

$$KAPBS=(x1 \times y1 \times \alpha11+x1 \times y2 \times \alpha12+x1 \times y3 \times \alpha13+x2 \times y1 \times \alpha21+x2 \times y2 \times \alpha22+ x2 \times y3 \times \alpha23+x3 \times y1 \times \alpha31+x3 \times y2 \times \alpha32+x3 \times y3 \times \alpha33)/(x1y1+x1y2+ x1y3+x2y1+x2y2+x2y3+x3y1+x3y2+x3y3) \quad (3)$$

where α11 represents an estimated output value applied when the congestion degree is large and at the same time the driver's accelerating intention based on the ACCSUM value is zero; α12 represents an estimated output value applied when the congestion degree is large and at the same time the driver's accelerating intention based on the ACCSUM value is small; α13 represents an estimated output value applied when the congestion degree is large and at the same time the driver's accelerating intention based on the ACCSUM value is large; α21 represents an estimated output value applied when the congestion degree is medium and at the same time the driver's accelerating intention based on the ACCSUM value is zero; α22 represents an estimated output value applied when the congestion degree is medium and at the same time the driver's accelerating intention based on the ACCSUM value is small; α23 represents an estimated output value applied when the congestion degree is medium and at the same time the driver's accelerating intention based on the ACCSUM value is large; α31 represents an estimated output value applied when the congestion degree is small and at the same time the driver's accelerating intention based on the ACCSUM value is zero; α32 represents an estimated output value applied when the congestion degree is small and at the same time the driver's accelerating intention based on the ACCSUM value is small; and α33 represents an estimated output value applied when the congestion degree is small and at the same time the driver's accelerating intention based on the ACCSUM value is large. These estimated output values are set as follows, for example: $\alpha11=0.1$, $\alpha12=0.5$, $\alpha13=1.0$, $\alpha21=0.5$, $\alpha22=0.8$, $\alpha23=1.0$, $\alpha31=0.8$, $\alpha32=0.9$, and $\alpha33=1.0$.

By the above calculation, the basic accelerator pedal position-dependent correction coefficient KAPBS obtained is set to a smaller value as the congestion degree is larger, and to a larger value as the driver's accelerating intention is larger.

Figure 6:
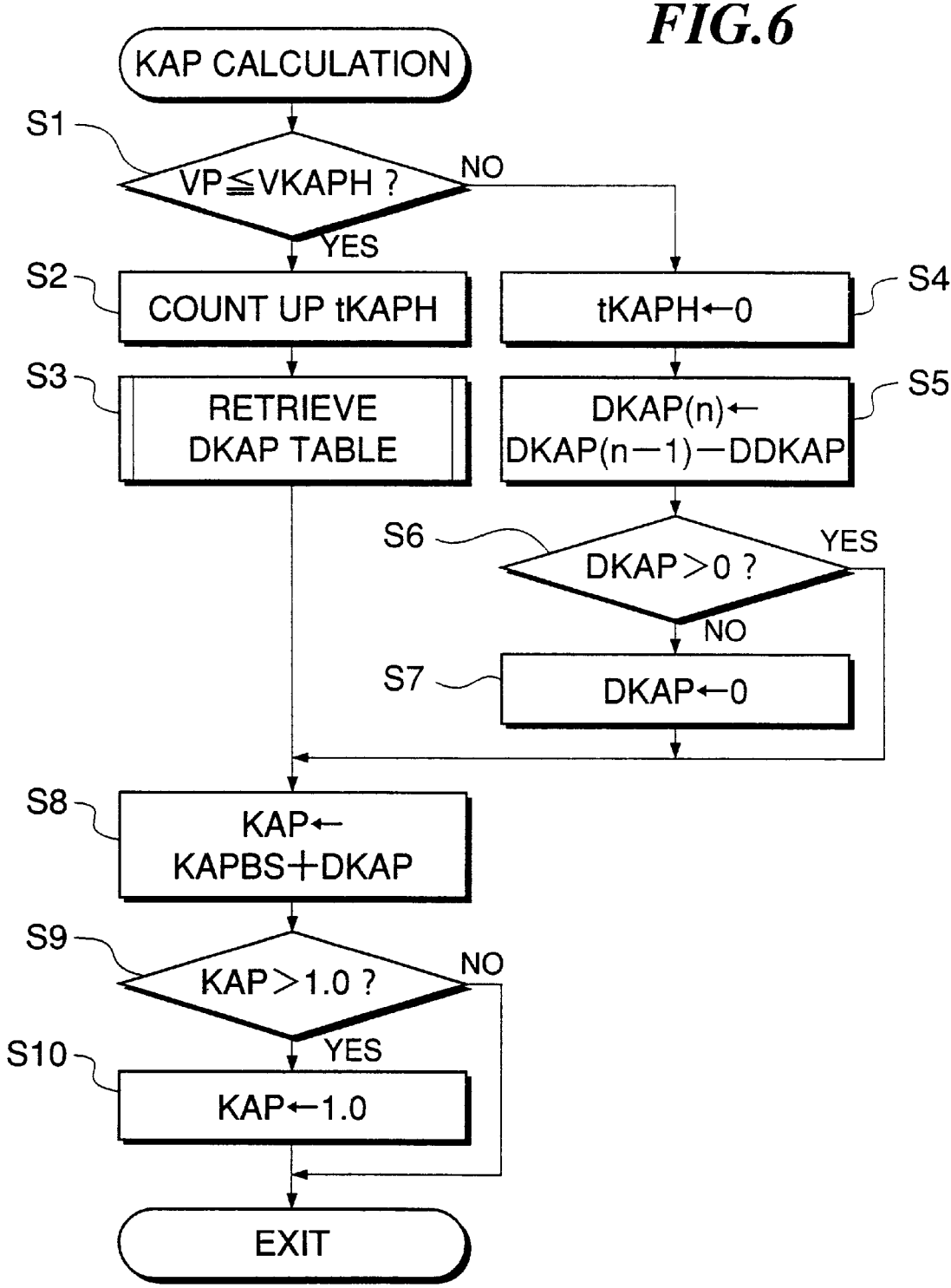
FIG. 6 is a flowchart showing a procedure for correcting an accelerator pedal position-dependent correction coefficient depending on a standing time period.

At block 106 and block 107, an accelerator pedal position-dependent correction coefficient KAP is calculated in a manner shown in FIG. 6, and the calculated coefficient KAP is input to block 108.

At a step S1 in FIG. 6, it is determined whether or not the vehicle speed VP is equal to or lower than a predetermined value VKAPH (e.g., 1 km/h). If V≦VKAPH holds, which means that the vehicle is standing or stopped, an up-counting timer tKAPH is caused to count up at a step S2. The timer tKAPH is reset to "0" when VP<VKAPH holds at a step S4. The predetermined vehicle speed value VKAPH is provided with hysteresis such that it is set to 1 km/h as above when it is determined whether or not the vehicle is stopped from a traveling condition, while it is set to 5 km/h when it is determined whether or not the vehicle is started from a standing position.

Figure 7:
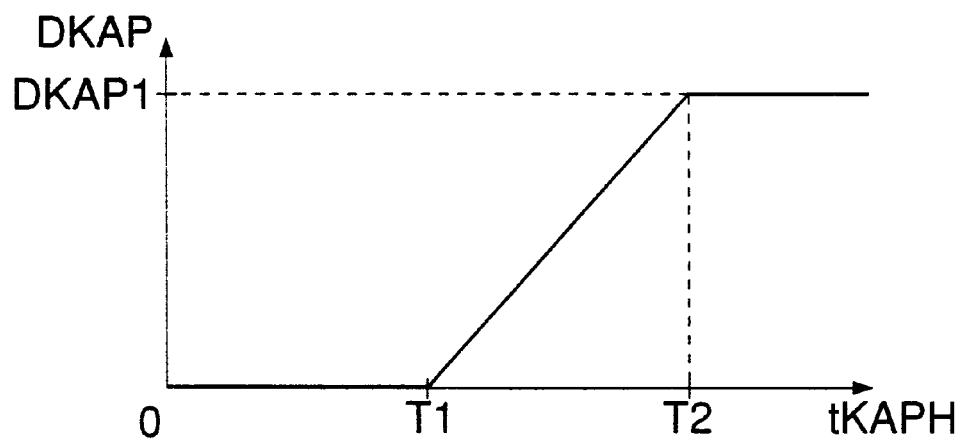
FIG. 7 shows a table for use in the procedure of FIG. 6.

At the following step S3, a DKAP table is retrieved according to the count value of the timer tKAPH to determine an addend term DKAP. The DKAP table is set, e.g., as shown in FIG. 7 such that the value DKAP is set to 0 so long as tKAPH≦T1 (e.g., 20 sec) holds, whereas the value DKAP is progressively increased as time elapses when T1<tKAPH<T2 holds, and the DKAP value is held at a constant value DKAP1 (e.g. 0.2) when tKAPH≧T2 holds.

Then, the basic accelerator pedal position-dependent correction coefficient KAPBS calculated at the block 105 is applied to the following equation (4) to calculate the accelerator pedal position-dependent correction coefficient KAP (step S8):

$$KAP=KAPBS+DKAP \quad (4)$$

Then, it is determined at a step S9 whether or not the coefficient KAP is larger than 1.0. If KAP≦1.0 holds, the present processing is immediately terminated, while KAP>1.0 holds, the correction coefficient KAP is set to 1.0 at a step S10, followed by terminating the processing.

On the other hand, if V>VKAPH holds at the step S1, the timer tKAPH is set to "0" at the step S4, and the addend term DKAP is decreased by the use of the following equation (5):

$$DKAP(n)=DKAP(n-1)-DDKAP \quad (5)$$

where DDKAP represents a predetermined value (e.g. 0.01).

At the following step S6, it is determined whether or not the DKAP value is a positive value. If DKAP>0 holds, the present processing is immediately terminated, whereas if DKAP≦0 holds, the DKAP value is set to "0" at a step S7, followed by the processing proceeding to the step S8.

According to the above processing, when the vehicle stands over the predetermined time period T1 or longer, the accelerator pedal position-dependent correction coefficient KAP is set to a value obtained by correcting the basic accelerator pedal position-dependent correction coefficient KAPBS in the increasing direction, and thereafter, as time elapses, the correction amount DKAP is increased. As a result, even when the driver's sense changes after the vehicle has been standing over a long time period, the driver can feel sufficient accelerability in starting the vehicle. Further, after the vehicle has been started, the addend term DKAP is progressively decreased until it becomes zero, to thereby prevent an abrupt change in the driver's sense immediately after starting the vehicle from a standing position thereof.

Further, the correction coefficient KAP is controlled such that it does not exceed the maximum value of 1.0 at the steps S9 and S10, and accordingly, the accelerator pedal opening AP is never corrected in the increasing direction. As a result, selection of the gear position using a corrected accelerator pedal position APFZ (block 109) is not adversely affected by the correction of the accelerator pedal opening AP, thereby avoiding a so-called shift-busy state (a state in which the gear position is frequently changed).

Referring again to FIG. 2, at block 108, the corrected accelerator pedal position APFZ is calculated by multiplying the accelerator pedal position AP by the correction coefficient KAP, and the calculated APFZ value is input to block 109 and block 110. At block 109, selection of the gear position is effected according to the vehicle speed VP and the corrected accelerator pedal position APFZ, and a command SFTCMD for selecting the selected gear position is output from block 109.

At block 110, a TTRCMD map is retrieved according to the vehicle speed VP and the corrected accelerator pedal position APFZ, to determine a desired wheel-driving torque TTRCMD. At block 111, a desired engine output torque TENGCMD is calculated based on the desired wheel-driving torque TTRCMD, the gear-shifting command SFTCMD, the engine rotational speed NE and the output shaft rotational speed NM. More specifically, a gear ratio γGRCMD corresponding to the gear-shifting command SFTCMD is determined, a rotational speed ratio eTR between the input and output shafts of the torque converter is calculated based on the engine rotational speed NE and the output shaft rotational speed NM, and a torque ratio kT is determined from the calculated rotational speed ratio eTR (see FIG. 12C). Then, the desired engine output torque TENGCMD is calculated utilizing the relationship of TTRCMD=TENGCMD×γGRCMD×kT and TENGCMD= TTRCMD/(γGRCMD×kT). The calculated desired engine output torque TENGCMD is input to a block 121.

An engine torque correction coefficient KTENG for correcting the desired engine output torque TENGCMD calculated as above is calculated at the block 112 and blocks 113 to 120.

Figure 8:
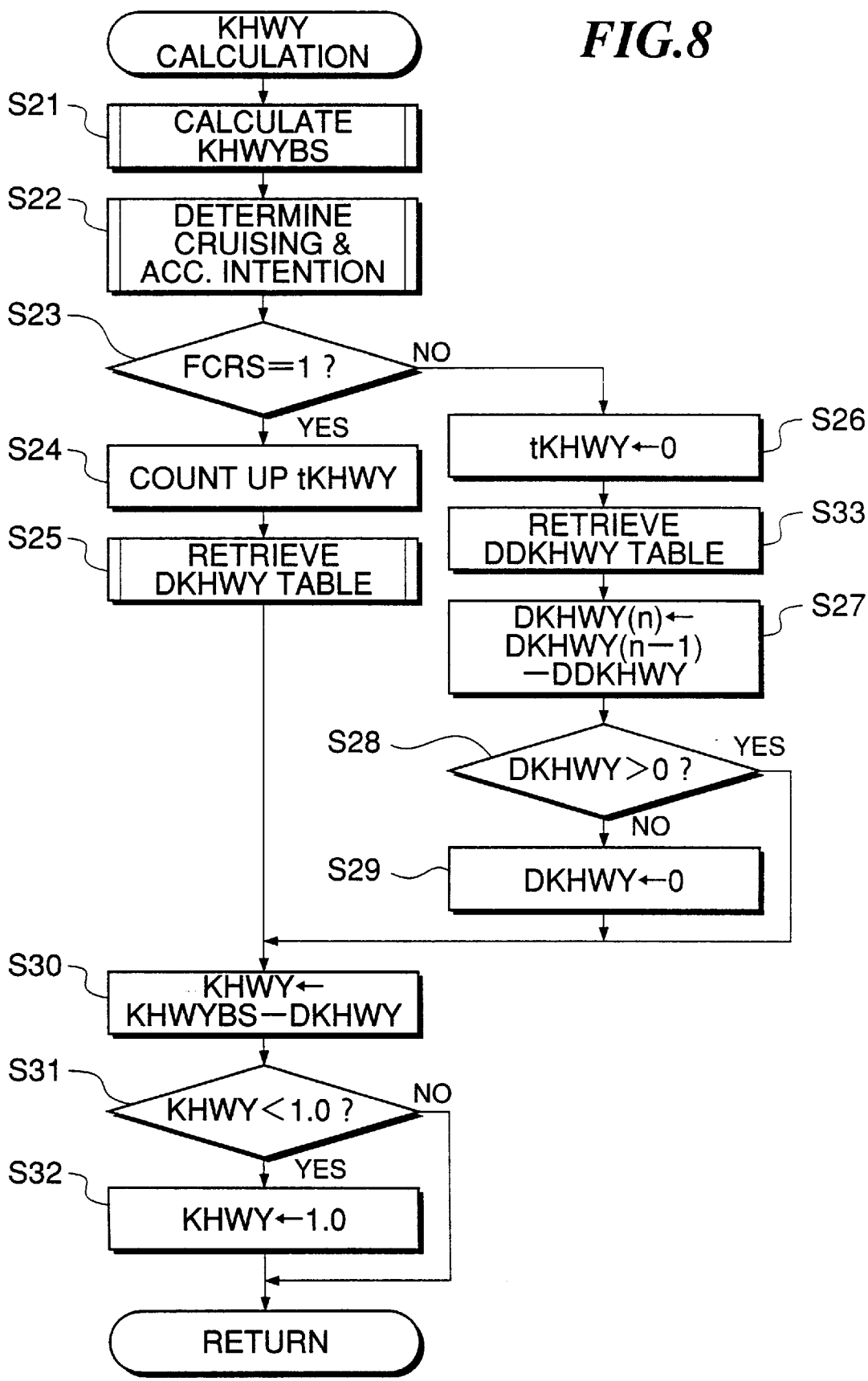
FIG. 8 is a flowchart showing a procedure for calculating a high-speed traveling-dependent correction coefficient for correcting the desired output engine torque.

More specifically, at the block 112, a high vehicle speed-dependent correction coefficient KHWY which depends upon a degree to which the vehicle speed VP is high (hereinafter referred to as "the high speed degree") is calculated based on the vehicle speed VP and the average vehicle speed VAVE, by a KHWY-calculating processing shown in FIG. 8.

Figure 10A:
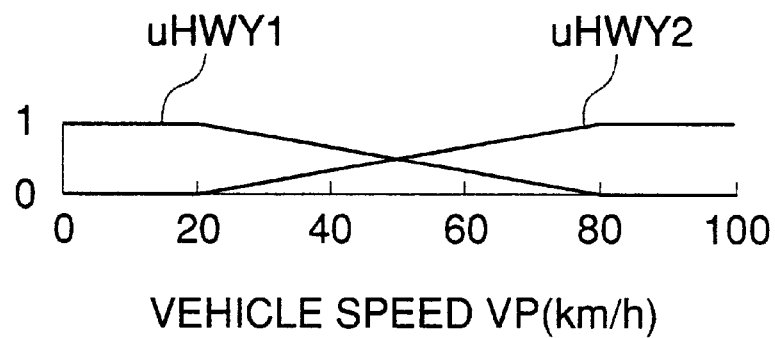
FIGS. 10A and 10B show tables for determining membership functions for use in estimating a degree of high-speed traveling.

First, at a step S21, a basic high vehicle speed-dependent correction coefficient KHWYBS is calculated in the following manner:

1) A table shown in FIG. 10A is retrieved according to the vehicle speed VP to determine a membership value uHWY1 for estimating that the vehicle speed is low, and a membership value uHWY2 for estimating that the vehicle speed is high.

Figure 10B:
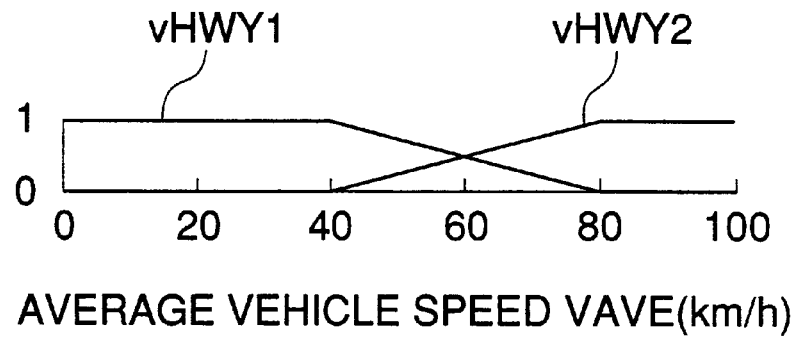

2) A table shown in FIG. 10B is retrieved according to the average vehicle speed VAVE to determine a membership value vHWY1 for estimating that the average vehicle speed is low, and a membership value vHWY2 for estimating that the average vehicle speed is high.

3) The basic high vehicle speed-dependent correction coefficient KHWYBS is calculated by the use of the following equation (6):

$$KHWYBS=(uHWY1\times vHWY1\times wHWY11+uHWY1\times vHWY2\times\\ wHWY12+uHWY2\times vHWY1\times wHWY21+uHWY1\times vHWY2\times\\ wHWY22)/(uHWY1\times vHWY1+uHWY1\times vHWY2+uHWY2\times\\ vHWY1+uHWY2\times vHWY2) \quad (6)$$

where wHWY11, wHWY12, wHWY21 and wHWY22 represent estimated output values determined from estimated output value maps, not shown. wHWY11 represents an estimated output value applied when the high speed degree based on the vehicle speed VP is low and at the same time the high speed degree based on the average vehicle speed VAVE is low; wHWY12 represents an estimated output value applied when the high speed degree based on the vehicle speed VP is low and at the same time the high speed degree based on the average vehicle speed VAVE is high; wHWY21 represents an estimated output value applied when the high speed degree based on the vehicle speed VP is high and at the same time the high speed degree based on the average vehicle speed VAVE is low; and wHWY22 represents an estimated output value applied when the high speed degree based on the vehicle speed VP is high and at the same time the high speed degree based on the average vehicle speed VAVE is high. These estimated output values are set as follows, for example: wHWY11=1.0, wHWY12= 1.0, wHWY21=1.0 and wHWY22=1.5.

Therefore, the KHWYBS value is set to a value within a range from 1.0 to 1.5, and accordingly the desired engine output torque TENGCMD is not corrected when the high speed degree is low, and corrected in the increasing direction as the high speed degree is higher. As a result, when the high speed degree is low, the driver can have a normal driving feeling, and when the high speed degree is high, the response of the engine output torque to operation of the accelerator pedal can be improved.

Referring again to FIG. 8, at the following step S22, a cruising-determining processing (FIG. 9) is executed to determine whether or not the vehicle is cruising.

Figure 9:
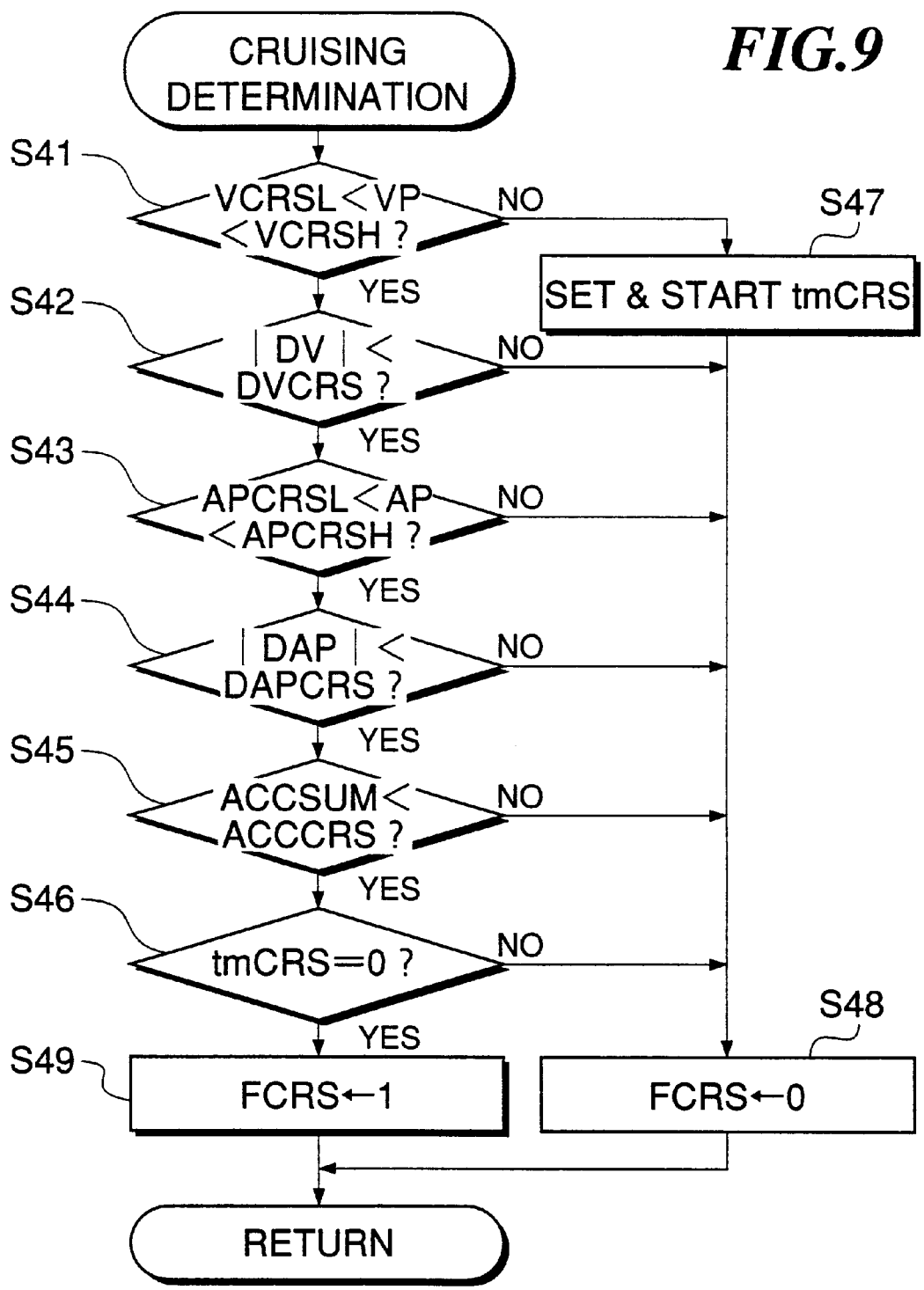
FIG. 9 is a flowchart showing a procedure for determining whether the vehicle is cruising.

At a step S41 in FIG. 9, it is determined whether or not the vehicle speed VP lies within a range defined by predetermined upper and lower limit values VCRSH and VCRSL (e.g. 120 km/h and 40 km/h, respectively). If the vehicle speed VP does not lie within the above range, a down-counting timer tmCRS is set to a predetermined time period TCRS (e.g. 5 sec) and started at a step S47, and a cruising flag FCRS, which, when set to "1", indicates that the vehicle is cruising, is set to "1" at a step S48, followed by terminating the present processing.

If the answer to the question of the step S41 is affirmative (YES), it is determined at a step S42 whether or not the absolute value of a change rate (acceleration) DV in the vehicle speed VP is smaller than a predetermined value DVCRS (e.g. a value corresponding to 0.5 km/h per sec). If |DV|<DVCRS holds, it is determined at a step S43 whether or not the accelerator pedal position AP lies within a range defined by predetermined upper and lower limit values APCRSH and APCRSL (e.g. 15 degrees and 5 degrees, respectively). If APCRSL<AP<APCRSH holds, it is determined at a step S44 whether or not the absolute value of the accelerator pedal speed DAP is smaller than a predetermined value DAPCRS (e.g. a value corresponding to 0.5 deg/sec). If |DAP|<DAPCRS holds, it is determined at a step S45 whether or not the cumulative value ACCSUM of the estimated driver's accelerating intention value ACCM is smaller than a predetermined value ACCCRS (e.g. 0.8). If the answer to any of the questions of the steps S42 to S45 is negative (NO), the processing proceeds to the step S48, whereas if the answers to all the questions of the steps S42 to S45 are affirmative (YES), it is determined at a step S46 whether or not the count value of the timer tmCRS is equal to "0". So long as tmCRS>0 holds, the processing proceeds to the step S48, whereas if tmCRS=0 holds after the lapse of the predetermined time period TCRS, it is determined that the vehicle is cruising, and then the cruising flag FCRS is set to "1" at a step S49, followed by terminating the present processing.

Referring again to FIG. 8, at the following step S23, it is determined whether or not the cruising flag FCRS is equal to "1". If FCRS=1 holds, which means that the vehicle is cruising, an up-counting timer tKHWY is caused to count up at a step S24. This timer tKHWY is set to "0" when FCRS=0 holds, at a step S26.

At the following step S25, a DKHWY table is retrieved according to the count value of the timer tKHWY to determine a subtrahend term DKHWY. The DKHWY table is set similarly to the DKAP table shown in FIG. 7, for example, such that when tKHWY≦T3 (e.g. 20 sec) holds, the DKHWY value is set to 0, when T3<tKHWY<T4 (e.g. 40 sec) holds, the DKHWY value is progressively increased as time elapses, and when tKHWY≧T4 (e.g. 40 sec), the DKHWY value is set to a predetermined value DKHWY1 (e.g. 0.2). Then, the high vehicle speed-dependent correction coefficient KHWY is calculated by the use of the following equation (7) at a step S30:

KHWY=KHWYBS-DKHWY (7)

Then, it is determined at a step S31 whether or not the obtained KHWY value is smaller than 1.0. If KHWY≧1.0 holds, the present processing is immediately terminated, while if KHWY<1.0 holds, the KHWY value is set to 1.0 at a step S32, followed by the processing.

Figure 11:
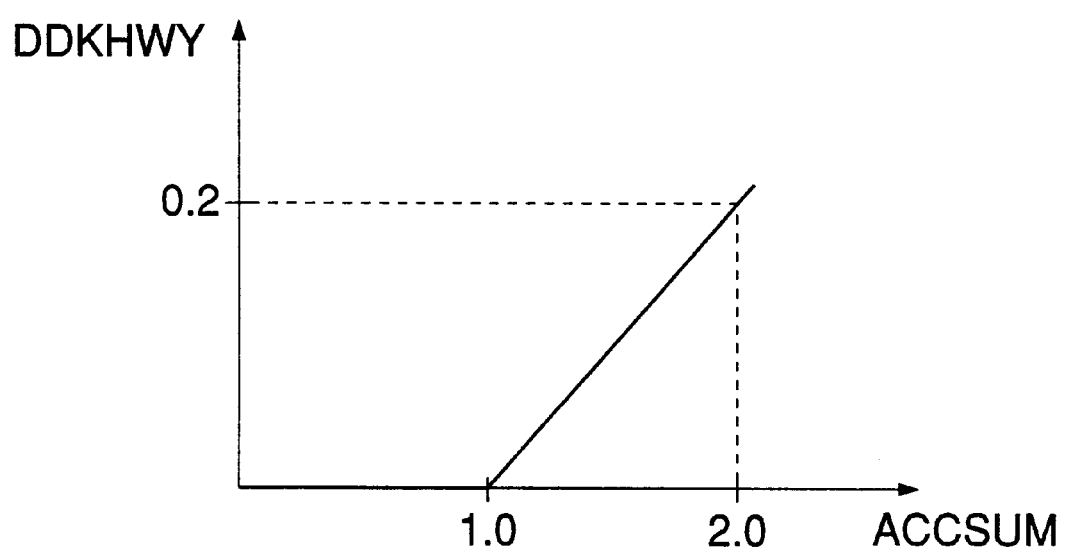
FIG. 11 shows a table for use in the processing of FIG. 8.

On the other hand, if FCRS=0 holds at the step S23, that is, if the vehicle is not cruising, the timer tKHWY is set to "0" at the step S26, and a table shown in FIG. 11 is retrieved according to the cumulative value ACCSUM of the estimated driver's accelerating intention value ACCM, to determine a decrement DDKHWY at a step S33. Then, the subtrahend term DKHWY is decreased by the use of the following equation (8):

DKHWY(n)=DKHWY(n-1)-DDKHWY (8)

Then, at a step S28, it is determined whether or not the DKHWY value obtained is a positive value. If DKHWY>0 holds, the present processing is immediately terminated, while if DKHWY≦0 holds, the DKHWY value is set to "0" at a step S29, and the processing proceeds to the step S30.

By the above processing, if the vehicle has been cruising over the predetermined time period T3 or longer, the high vehicle speed-dependent correction coefficient KHWY is set to a value obtained by correcting the basic high vehicle speed-dependent correction coefficient KHWYBS, and thereafter its correction amount DKHWY is increased with the lapse of time. As a result, even when the driver's sense changes after a long time period cruising, deterioration of the driver's sense can be prevented in accelerating or decelerating the vehicle from the cruising condition. Further, since after the vehicle has stopped cruising, the subtrahend term DKHWY is progressively decreased until it becomes equal to "0", an abrupt change in the driver's sense can be prevented immediately after the termination of cruising.

At the blocks 113 to 116, a gradient-dependent correction coefficient KSLP is calculated based on the gradient of a road on which the vehicle is traveling.

Figure 12A:
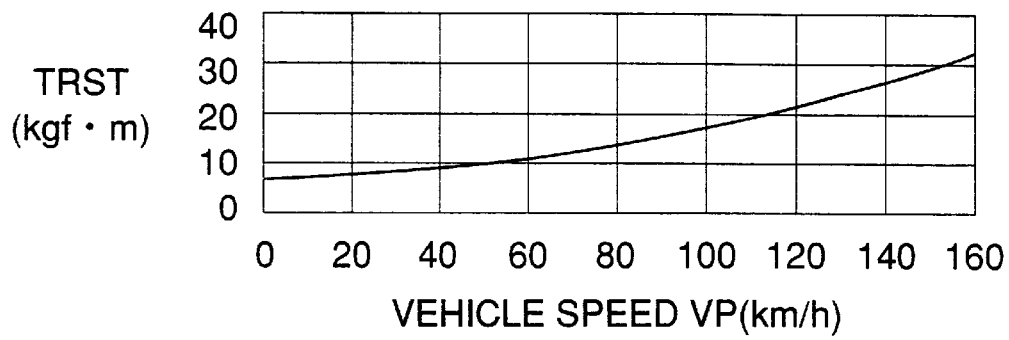
FIGS. 12A to 12C show tables for use in determining a gradient-dependent correction coefficient for correcting the desired engine output.

At the block 113, the acceleration value DV (=V(n)-V (n-5) is calculated from the vehicle speed VP, and the calculated DV value is input to the block 116. At the block 114, a table shown in FIG. 12A is retrieved according to the vehicle speed VP to determine a running resistance torque TRST to be obtained when the vehicle is traveling on a flat road, and the determined TRST value is input to the block 116. The running resistance torque TRST is the sum of the surface road resistance torque and the air resistance torque. The TRST table in FIG. 12A is set on the assumption that the vehicle weight is a reference weight (e.g. 1500 kg).

Figure 12B:
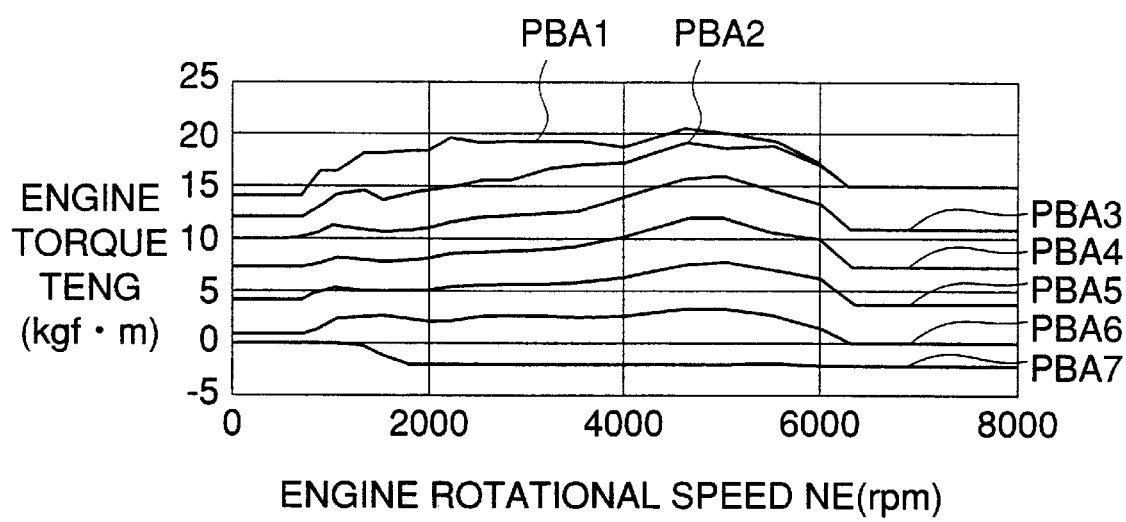
Figure 12C:
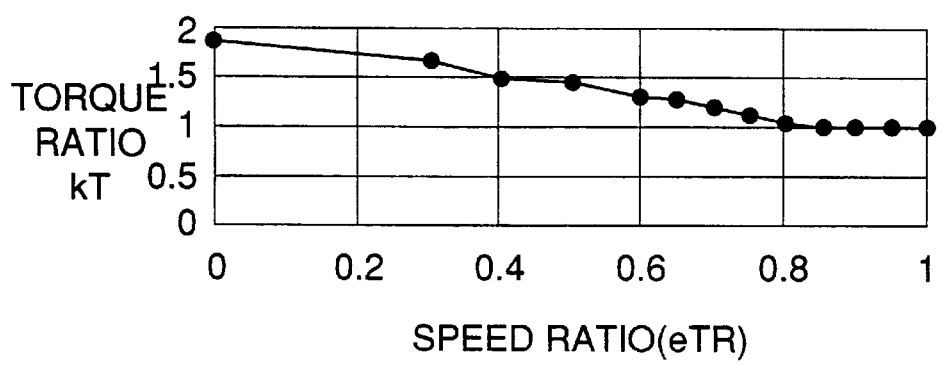

At the block 115, the actual wheel-driving torque TTR is calculated, based on the vehicle speed VP, the engine rotational speed NE, the intake pipe absolute pressure PBA, the detected gear position GP and the output shaft rotational speed NM of the torque converter, in the following manner:

1) A table shown in FIG. 12B is retrieved according to the engine rotational speed NE and the intake pipe absolute pressure PBA, to determine an engine output torque TENG. The TENG table in FIG. 12B is set such that a plurality of TENG value curves are provided for respective predetermined PBA values PBA1 to PBA7 (PBA1>PBA2> . . . PBA7), a value of each PBA curve being to be selected according to the engine rotational speed NE, 2) A value of the rotational speed ratio eTR of the torque converter is calculated based on the output shaft rotational speed NM of the torque converter of the automatic transmission 30 and the engine rotational speed NE, and a table shown in FIG. 12C is retrieved according to the calculated eTR value to determine the torque ratio kT.

3) A value of the wheel-driving torque TTR is calculated by the use of the following equation (9):

TTR=TENG×kT×γGR (9)

where γGR represents a gear ratio corresponding to the gear position GP. The calculated wheel-driving torque TTR value is input to the block 116. The block 116 calculates the gradient-dependent correction coefficient KSLP in the following manner:

1) Provided that acceleration resistance torque and gradient resistance torque obtained when the vehicle is traveling on a flat road are designated by TACC (=DV×reference weight) and TSLP, respectively, the relationship of TTR= TRST+TACC+TSLP stands. Therefore, the gradient resistance torque TSLP is calculated by the use of the following equation (10):

TSLP=TTR-TRST-TACC (10)

Figure 13A:
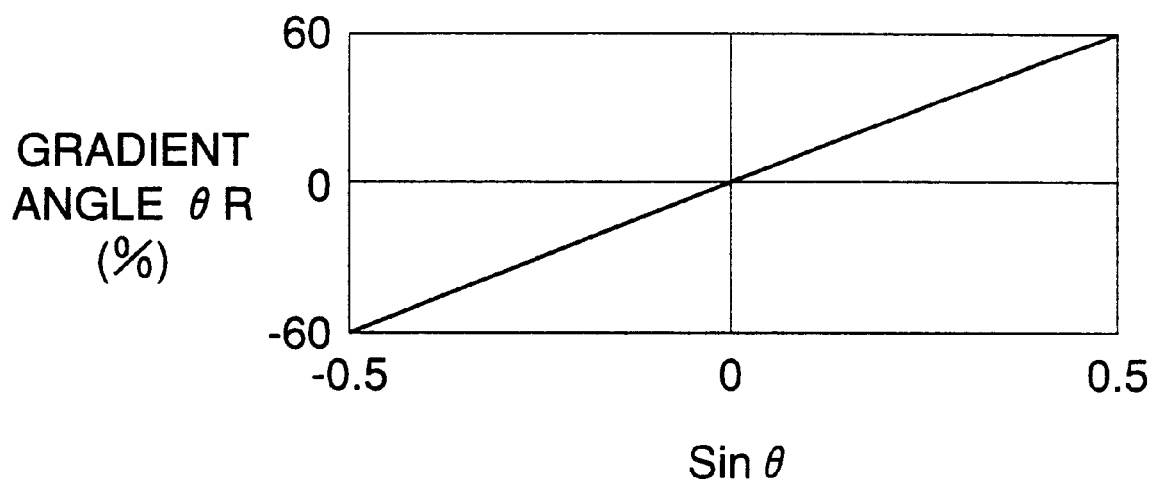
FIGS. 13A and 13B show tables for use in determining the gradient-dependent correction coefficient.

2) Provided that the gradient angle is designated by θ, Sin θ=gradient resistance force FSLP/weight W and gradient resistance force FSLP=gradient resistance torque TSLP/wheel radius R hold. Therefore, Sin θ is calculated by the use of an equation of Sin θ=TSLP/(W×R) (the weight W is set, e.g. to the reference weight). A table shown in FIG. 13A is retrieved according to the calculated Sin θ value to determine a gradient angle θR (%).

Figure 13B:
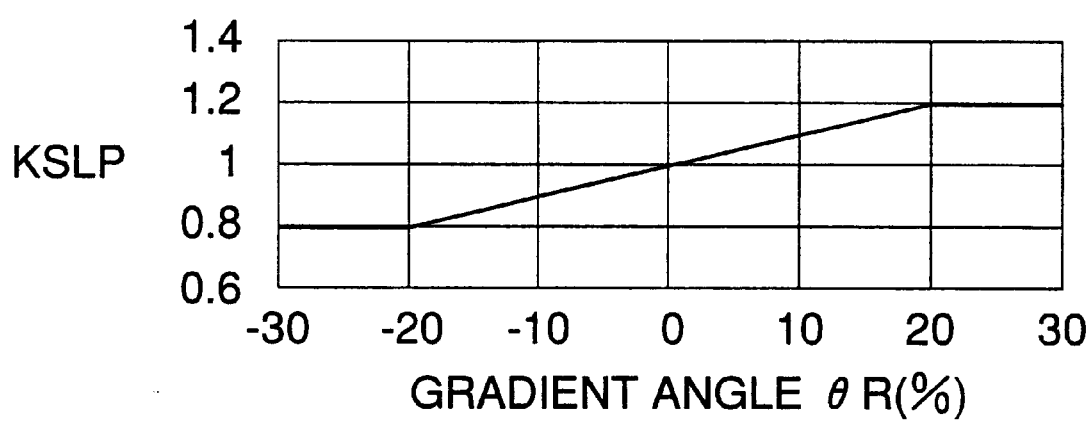

3) A table shown in FIG. 13B is retrieved according to the determined angle θR (%) to determine the gradient-dependent correction coefficient KSLP. When the gradient angle θR assumes a negative value, it means that the vehicle is traveling on a descent.

By using the gradient-dependent correction coefficient KSLP obtained as above, when the vehicle is traveling on an ascent, the desired engine output torque TENGCMD is corrected in the increasing direction (KSLP>1.0), while when the vehicle is traveling on a descent, the TENGCMD value is corrected in the decreasing direction (KSLP<1.0), to thereby improve the drivability during traveling of the vehicle on an ascent and a descent.

At the block 117 and blocks 118 to 117 to 119 in FIG. 2, a rough accelerator pedal rugged road-dependent correction coefficient KWR is calculated. This correction coefficient KWR is provided in order to reduce the influence of an operation of the accelerator pedal such that the accelerator pedal is repeatedly suddenly stepped on and returned (rough accelerator pedal operation), upon the desired engine output torque, as well as improve the response of the engine output torque to the operation of the accelerator pedal when the vehicle is traveling on a rugged road.

At the block 117, a cumulative value SDAP of the absolute value of the accelerator pedal speed DAP is calculated by the use of the following equation (11), and the calculated SDAP value is input to the block 119.

$$SDAP(n)=SDAP(n-1)+|DAP(n)| \quad (11)$$

More specifically, the above cumulation is executed at predetermined time intervals (e.g. 20 msec). Whenever 2 seconds elapse, a value of the cumulative value SDAP obtained over the past time period of 2 seconds is output and used. By this operation, a rate of change in the accelerator pedal position such as a stepping-on motion or a return motion of the accelerator pedal is cumulated, so that both the stepping-on amount and the return amount are monitored. So long as the accelerator pedal is held at a constant position, the accelerator pedal speed is zero and accordingly the cumulative value becomes zero.

At the block 118, a frequency NFRQPS of turning-on and -off of the power steering switch 33 is calculated and input to the block 119. More specifically, detection of turning-on or -off of the power steering switch 33 is made at predetermined time intervals (e.g. 20 msec). Only when the power steering switch 33 is turned on from an off position, a count value is incremented by 1, while when the switch 33 is turned off from an on position, the count value is not changed. Whenever 10 seconds elapse, the total count value obtained over the past time period of 10 seconds is used as the frequency NFRQPS.

Figure 14A:
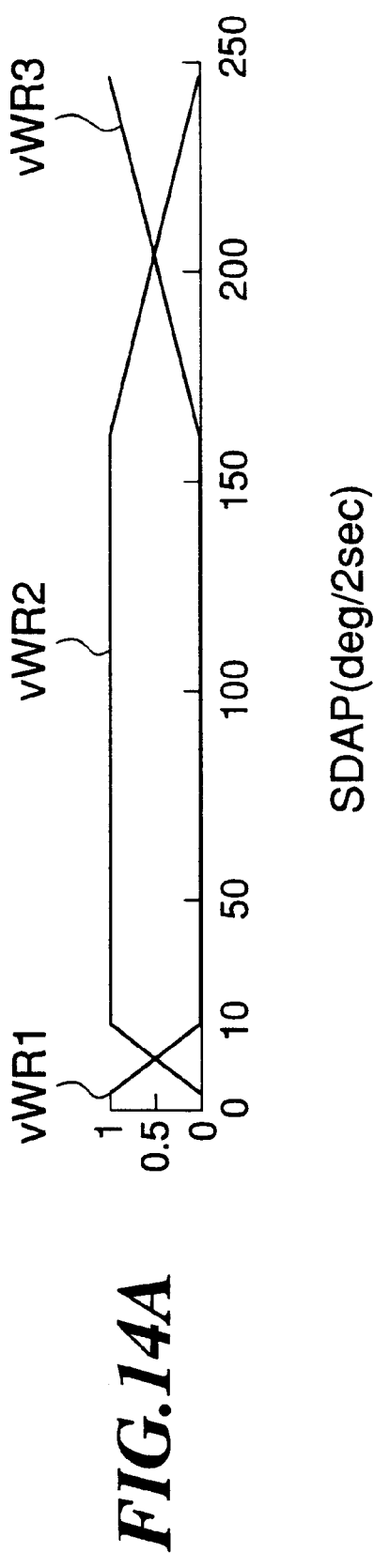
FIGS. 14A and 14B show tables for determining membership functions for use in estimating a degree of operation of the accelerator pedal and a degree of unevenness of a rugged road.

At the block 119, the rough accelerator pedal rugged road-dependent correction coefficient KWR is calculated in the following manner:

1) A table shown in FIG. 14A is retrieved according to the cumulative accelerator pedal speed value SDAP to determine a membership value vWR1 for estimating that the roughness of the accelerator pedal operation is small, a membership value vWR2 for estimating that the roughness is medium, and a membership value vWR3 for estimating that the roughness is large.

Figure 14B:
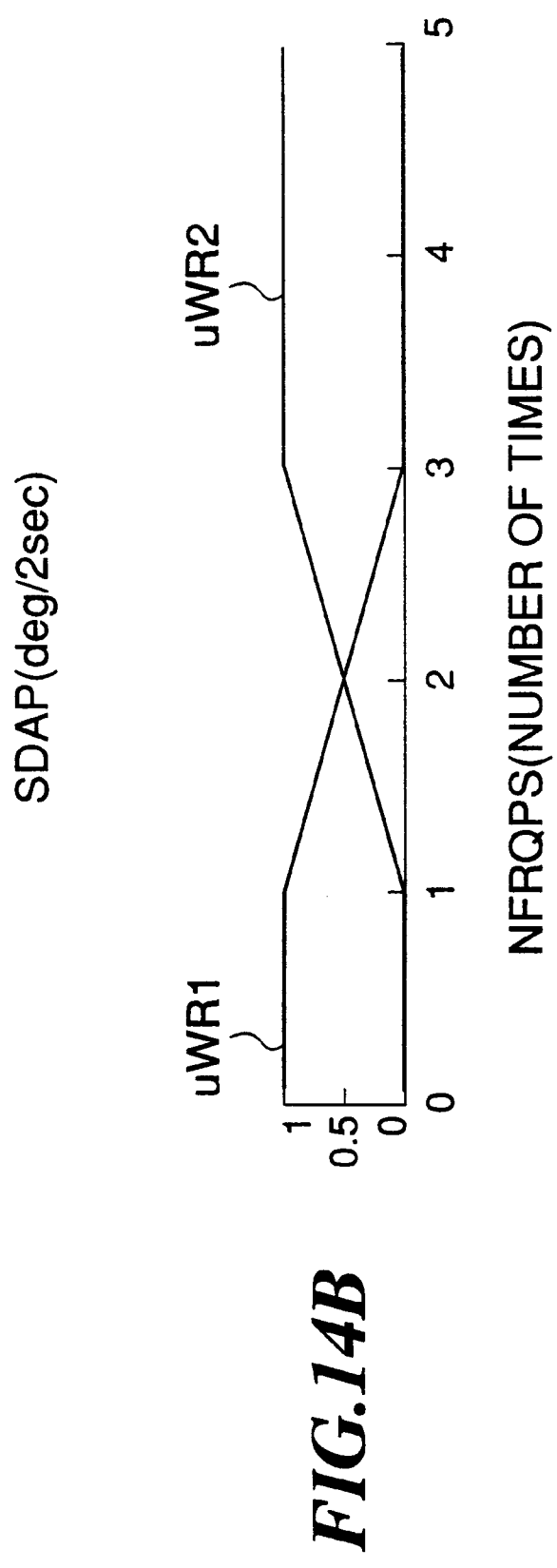

2) A table shown in FIG. 14B is retrieved according to the frequency NFRQPS of turning-on and -off of the power steering switch 33 to determine a membership value uWR1 for estimating that the roughness or unevenness of the road is small and a membership value uWR2 for estimating that the roughness or unevenness of the road is large.

3) Then, the rough accelerator pedal rugged road-dependent correction coefficient KWR is calculated by the use of the following equation (12):

$$KWR=(uWR1{\times}vWR1{\times}wWR11+uWR1{\times}vWR2{\times}wWR12+uWR1{\times}vWR3{\times}wWR13+uWR2{\times}vWR1{\times}$$

$$wWR21+uWR2{\times}vWR2{\times}wWR22+uWR2{\times}vWR3{\times}wWR23)/(uWR1{\times}vWR1+wWR2{\times}vWR2n+$$

$$uWR1{\times}vWR3+uWR1{\times}vWR1+uWR2{\times}vWR2+uWR2{\times}vWR3) \quad (12)$$

where wWR11, wWR12, wWR13, wWR21, wWR22 and wWR23 represent estimated output values obtained from maps, not shown. wWR11 represents an estimated output value applied when the roughness of the road is small and at the same time the roughness of the accelerator pedal operation is small; wWR12 represents an estimated output value applied when the roughness of the road is small and at the same time the roughness of the accelerator pedal operation is medium; wWR13 represents an estimated output value applied when the roughness of the road is small and at the same time the roughness of the accelerator pedal operation is large; wWR21 represents an estimated output value applied when the roughness of the road is large and at the same time the roughness of the accelerator pedal operation is small; wWR22 represents an estimated output value applied when the roughness of the road is large and at the same time the roughness of the accelerator pedal operation is medium; and wWR23 represents an estimated output value applied when the roughness of the road is large and at the same time the roughness of the accelerator pedal operation is large. These wWR1 values are set as follows: wWR11=1.0, wWR12=1.0, wWR13=0.5, wWR21=1.0, wWR22=1.5, and wWR23=1.0. The reason why the estimated output value wWR23 applied when the roughness of the road is large and at the same time the roughness of the accelerator pedal operation is large is set to 1.0 (non-correction value) is that in such a case there is a possibility that the accelerator pedal position sensor and/or the power steering switch does not properly operate, and therefore the wWR23 value is set to 1.0 for failsafe purposes.

According to the above equation (12), the KWR value is set to a range from 0.5 to 1.5, such that the desired engine output torque TENGCMD is corrected in the decreasing direction when the roughness of the accelerator pedal operation is large and at the same time the roughness or unevenness of the road is small, and corrected in the increasing direction when the roughness of the accelerator pedal operation is medium and at the same time the roughness or unevenness of the road is large. As a result, degradation in the drivability can be prevented when the driver abruptly operates the accelerator pedal to an unnecessarily excessive degree (rough operation of the accelerator pedal), while a prompt response in the engine output torque can be obtained during traveling on a rugged road.

Referring again to FIG. 2, at the block 120, the engine torque correction coefficient KTENG is calculated by the use of the following equation (13) and the calculated KTENG value is input to the block 121:

$$KTENG=KHWY{\times}KSLP{\times}KWR \quad (13)$$

At the block 121, the desired engine output torque TENGCMD is corrected by the engine torque correction coefficient KTENG by the use of the following equation (14), to calculate and output the final desired engine output torque TENGCMDM:

$$TENGCMDM = TENGCMD \times KTENG \tag{14}$$

Based on the final desired engine output torque TENGCMDM thus obtained, the desired valve opening of the throttle valve 3 is determined, according to which the throttle actuator 20 is driven such that the actual throttle valve opening becomes equal to the desired valve opening.

As described above, according to the present embodiment, the correction of the accelerator pedal position or opening AP which affects the selection of the gear position of the automatic transmission 30 is effected only in the decreasing direction by the accelerator pedal position-dependent correction coefficient KAP (KAP≦1.0), while the change of the desired driving force in the increasing direction is effected by the desired engine output torque TENGCMD which does not affect the selection of the gear position. As a result, it is possible not only to avoid a shift-busy state to be caused by correction of the accelerator pedal opening AP in the increasing direction, but also properly carry out the correction of the engine output torque in the increasing direction, thereby further improving the drivability.

Generally, when the accelerator pedal opening AP is corrected in the decreasing direction, a gear position-shifting point on a gear position map used is shifted in the direction of increasing the accelerator pedal opening, and accordingly a shift-busy state is unlike to occur, while when the accelerator pedal opening AP is corrected in the increasing direction, the gear position-shifting point is shifted in the direction of decreasing the accelerator pedal opening so that a shift-busy state is likely to occur. In view of this fact, according to the invention, the change of the desired driving force in the increasing direction is carried out in a manner not affecting the selection of the gear position, thereby avoiding occurrence of a shift-busy state.

The present invention is not limited to the above described embodiment, but various modifications and variations thereto are possible. For example, insofar as the first to third objects of the invention are to be attained, the prime mover for driving the vehicle is not limited to an internal combustion engine, but it may be other kinds of engines or electric motors. Further, the operating means by which the driver controls the output from the prime mover is not limited to an accelerator pedal, but it may be operating means which can be manually operated by hand. The automatic transmission is not limited to an automatic transmission of a type selecting a plurality of gear position, but it may be a stepless type such as a CVT. In this alternative case, the term "gear position" should be replaced by "reduction ratio".

As described above, according to the invention, the desired driving force is corrected according to a time period over which the vehicle stays in a particular operating condition. As a result, the drivability can be improved in starting the vehicle from a standing position thereof after the vehicle has been standing on a congested street or the like, as well as in accelerating the vehicle after it has been cruising over a long time period.

Further, according to the invention, the correction of the driving force is carried out by both changing parameters used in the gear ratio (reduction ratio) control and changing parameters not affecting the gear ratio control. As a result, the setting of the driving force of the vehicle and the gear ratio of the automatic transmission can be properly carried out, thereby further improving the drivability.

Next, a second embodiment of the invention will be described with reference to FIG. 15 through FIG. 21. The hardware construction or arrangement of the present embodiment is substantially identical with that of the first embodiment described above, and description of which is therefore omitted.

The present embodiment carries out control of reducing the engine output torque in order to protect the automatic transmission without impairing the catalytic converter arranged in the engine exhaust system due to irregular combustion of the engine or the like.

Figure 15:
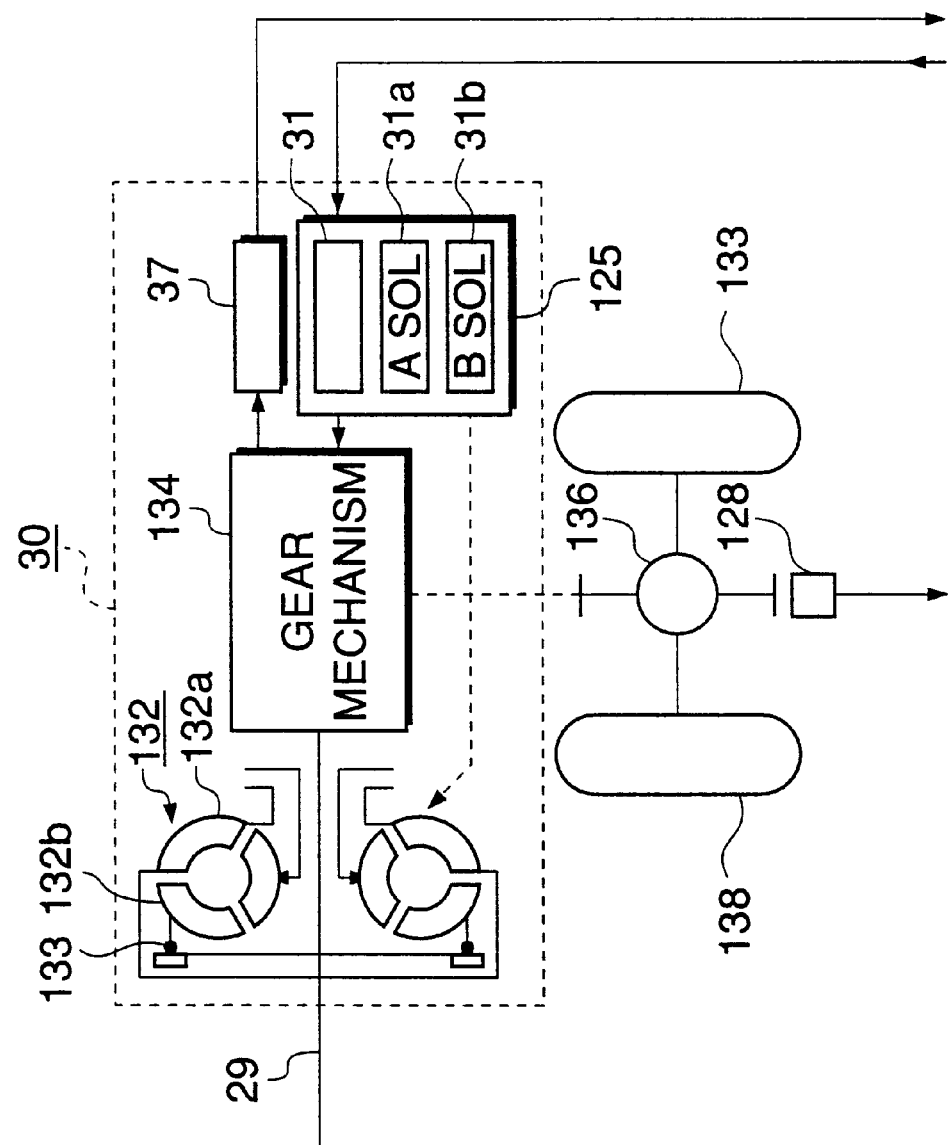
FIG. 15 is a block diagram schematically showing the construction of an automatic transmission appearing in FIG. 1.

FIG. 15 shows the construction of the automatic transmission 30.

The automatic transmission 30 is connected to the output shaft 29 of the engine. The automatic transmission 30 is comprised of a torque converter 132 having a pump impeller 132a and a turbine runner 132b, a lock-up clutch 133 for coupling the pump impeller 22a and the turbine runner 132b together, a gear mechanism 134 connected to an output side of the torque converter 132, and a hydraulic control device 135 for controlling the operation of the lock-up clutch 133 and that of the gear mechanism 134.

The hydraulic control device 135 includes an ON-OFF type solenoid valve (hereinafter referred to as "the A solenoid valve") 135a for switching between engagement and disengagement of the lock-up clutch 133, a duty ratio control type solenoid valve (hereinafter referred to as "the B solenoid valve") 135b for controlling the engaging force of the lock-up clutch 133 when the A solenoid valve 135a is energized or open to thereby hold the lock-up clutch 133 in engagement, and the gear-shifting actuator 31 for controlling the gear position (i.e. change gear ratio) of the gear mechanism 134. The A solenoid valve 135a, the B solenoid valve 135b and the gear-shifting actuator 31 are all electrically connected to the ECU 5 in FIG. 1 for controlling the automatic transmission 30. The ECU 5 controls the operation of the lock-up clutch 133 by means of the A solenoid valve 135a and the B solenoid valve 135b, and at the same time controls the gear position of the gear mechanism 134 by means of the gear-shifting actuator 31 Output torque from the engine 1 in FIG. 1 is transmitted from the output shaft 29 through the torque converter 132, the gear mechanism 134, and a differential gear mechanism 136 to right and left driving wheels 132, 133 in the mentioned order, thereby driving these wheels.

Figure 16:
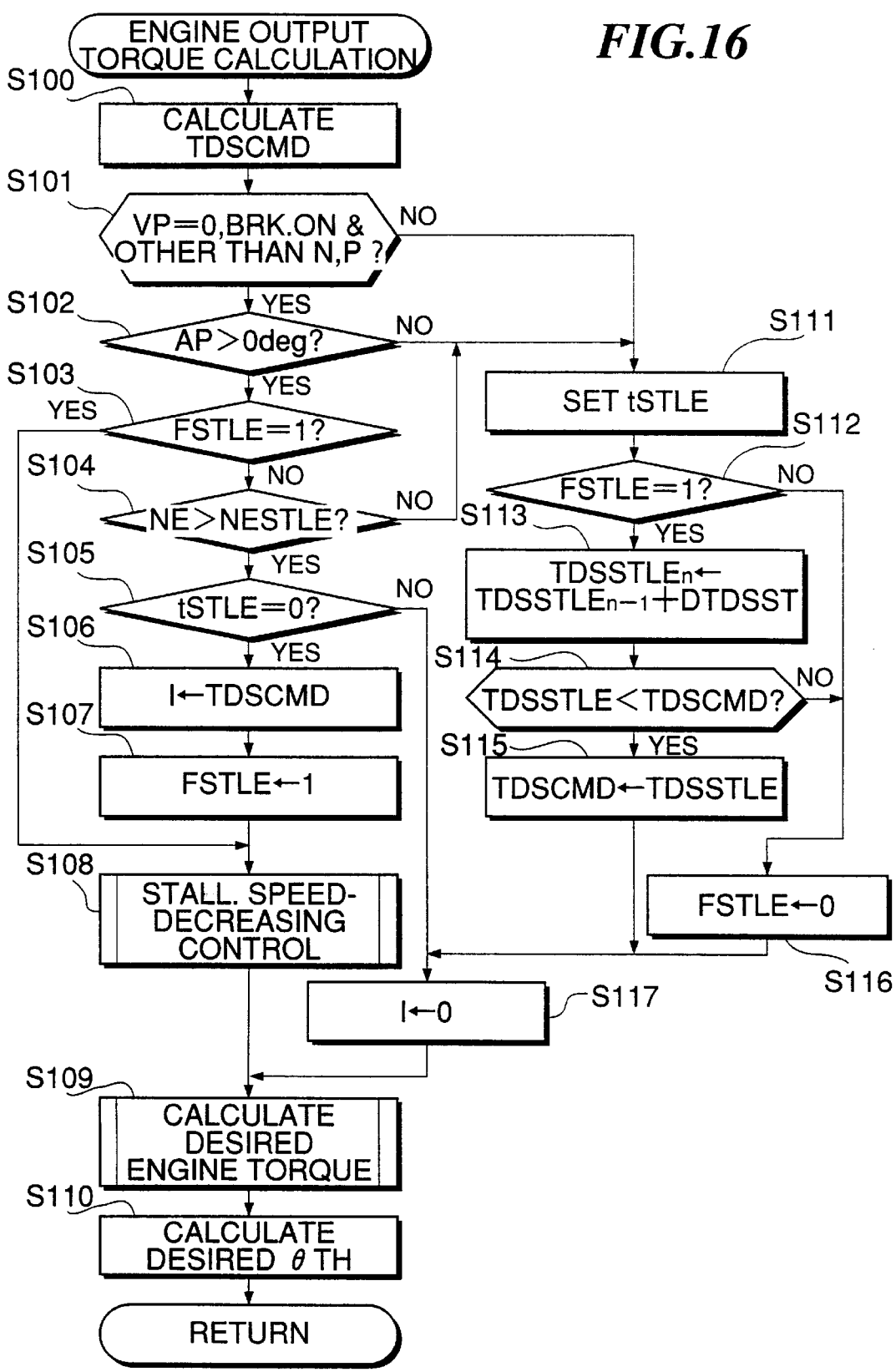
FIG. 16 is a flowchart showing a procedure for controlling engine output according to a second embodiment of the invention.

The engine output torque control according to the present embodiment will now be described with reference to FIG. 16 showing a flowchart of a procedure for carrying out the engine output torque control.

In FIG. 16, first, at a step S100, the vehicle speed VP from the vehicle speed sensor 28 and the accelerator pedal position AP from the accelerator pedal position sensor 22 are fetched. A desired driving torque TDSCMD is calculated from a map, not shown, according to the vehicle speed VP and the accelerator pedal position AP.

Then, at a step S101, based on the vehicle speed VP, the on/off position of the brake switch 24, and the shift position from the shift position sensor 23, it is determined whether or not a stall condition is satisfied, which is a condition that the vehicle speed VP is zero, the brake switch 24 is on, i.e. the brake system of the vehicle is operated, and at the same time the shift position of the automatic transmission 30 is set to a position other than a neutral (N) position SP or a parking (P) position, i.e. set to a traveling (D) position or a reverse (R) position.

Figure 18:
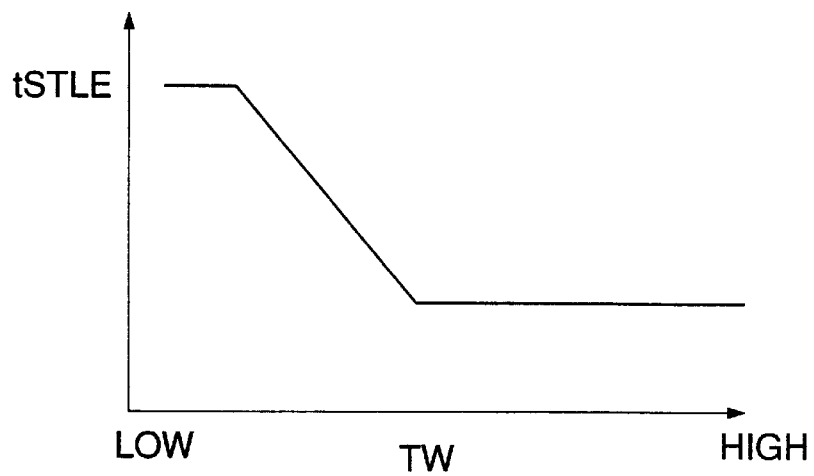
FIG. 18 shows a table for determining a time period tSTLE set to a timer tSTLE for determining timing of starting the control of decreasing the stalling engine rotational speed, according to engine coolant temperature TW.

If the stall condition is not satisfied, the processing proceeds to a step S111, wherein a timer tSTLE for determining timing of starting the control of decreasing the stalling engine rotational speed is set to a predetermined time period tSTLE and started. The predetermined time period tSTLE is determined by the engine coolant temperature TW. More specifically, a table shown in FIG. 18 is retrieved according to the engine coolant temperature TW to determine the predetermined time period tSTLE. The table in FIG. 18 is set such that as the engine coolant temperature TW is higher, the predetermined time period tSTLE is set to a shorter time period.

At the following step S112, it is determined whether or not a flag FSTLE, which, when set to "1", indicates that control of decreasing the stalling engine rotational speed is to be executed, is equal to "1". If FSTLE=1 does not hold, the processing proceeds to a step S116, wherein the flag FSTLE is set to "0".

Following the step S116, the processing proceeds to a step S117, wherein an integral term I, hereinafter referred to, is set to "0", and then at a step S109, a desired engine output torque TECMD is calculated by the use of the following equation (15):

$$TECMD = TDSCMD/INGEAR/KETR \quad (15)$$

where KETR represents a correction coefficient dependent upon the transmission efficiency of the torque converter, which is determined according to a slip amount e in the torque converter (=the ratio between the input shaft rotational speed and the output shaft rotational speed), and INGEAR represents a selected gear ratio of the gear mechanism 134 of the automatic transmission 30.

Then, at a step S110, a desired throttle valve opening TH is calculated based on the desired engine output torque TECMD and the engine rotational speed NE.

On the other hand, if it is determined at the step S101 that the stall condition is satisfied, the processing proceeds to a step S102, wherein it is determined whether or not the accelerator pedal opening AP exceeds 0 degrees. If AP>0 degrees holds, it is determined at a step S103 whether or not the flag FSTLE is equal to "1". If the flag FSTLE is equal to "1", the processing skips over steps S104 to S107, hereinafter referred to, to a step S108, to carry out the stalling rotational speed-decreasing control, hereinafter described.

If it is determined at the step S103 that the flag FSTLE is not equal to "1", the processing proceeds to a step S104, wherein it is determined whether or not the engine rotational speed NE exceeds a stalling engine rotational speed NESTL. This stalling engine rotational speed NESTLE is set to a value at or above which a stall state can occur, i.e. a value at or above which heat generated by the torque converter exceeds an allowable amount.

If NE>NESTLE holds at the step S104, it is determined at a step S105 whether or not the count value of the timer tSTLE set at the step S111 is equal to "0". If the count value has not reached "0", it is determined that although a stall state has occurred, the timing of starting the control of decreasing the stalling engine rotational speed has not been reached, and then at the step S117 the integral term I is set to "0", followed by executing the steps S109 and S110 and terminating the processing.

If it is determined at the step S105 that the count value of the timer tSTLE is equal to "0", it is determined that the timing of starting the control of decreasing the stalling engine rotational speed has been reached, and then the processing proceeds to a step S106, wherein the flag FSTLE is set to "1" to indicate that the control of decreasing the stalling engine rotational speed is to be started.

At the following step S108, the control of decreasing the stalling engine rotational speed is executed to decrease the engine rotational speed NE below the stalling rotational speed NESTLE.

Figure 17:
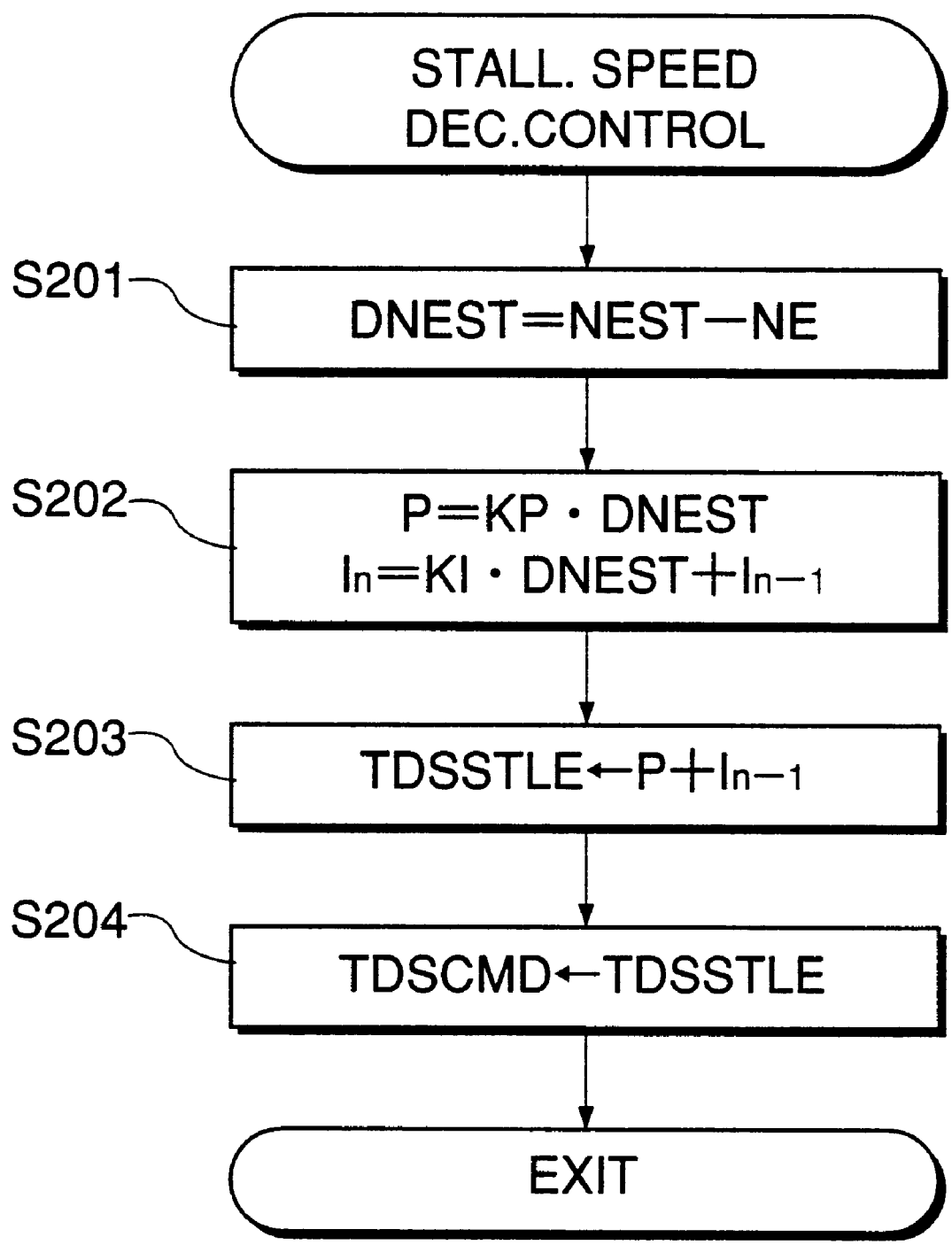
FIG. 17 is a flowchart showing a procedure for decreasing a stalling engine rotational speed executed at a step S108 in FIG. 16.
Figure 19:
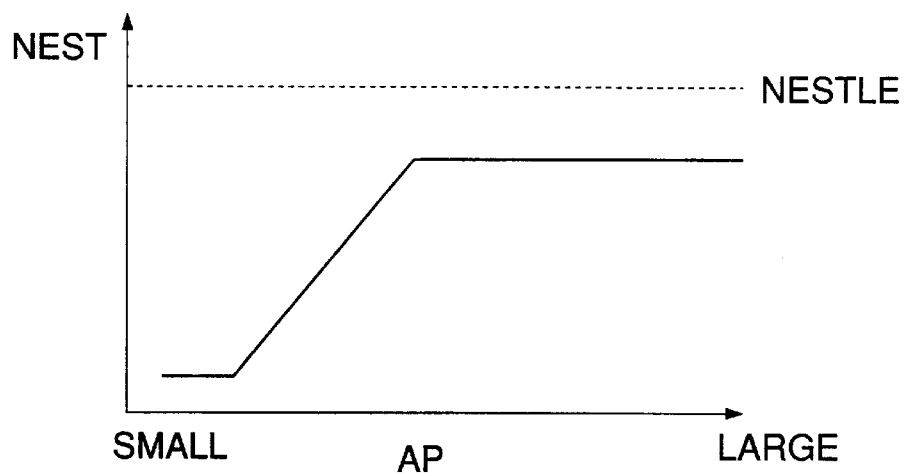
FIG. 19 shows a table for determining a desired engine rotational speed for use in the control of decreasing the stalling engine rotational speed, according to accelerator pedal position AP.

More specifically, the control is carried out by a procedure shown in FIG. 17. First, at a step S201, a difference DNEST between a desired rotational speed NEST and the engine rotational speed NE is determined according to the accelerator pedal position AP. The desired rotational speed NEST is determined from a table shown in FIG. 19, according to the accelerator pedal position AP. The table in FIG. 19 is set such that as the accelerator pedal position or opening AP is larger, the desired rotational speed NEST is progressively increased, and after the opening AP exceeds a predetermined opening, the desired rotational speed NEST is held at a constant value. The desired rotational speed NEST, however, is always set to a value within an idling rotational speed range of the engine at any value of the accelerator pedal opening AP.

At the following step S202, a proportional term P and the integral term I are calculated according to the above determined difference DNEST by the use of the following respective equations (16) and (17):

$$P = KP \times DNEST \quad (16)$$

$$I(n) = KI \times DNEST + I(n+1) \quad (17)$$

where KP and KI represent a proportional term correction coefficient and an integral term correction coefficient, respectively.

Then, the processing proceeds to a step S203, wherein the proportional term P and the integral term I calculated above are added together into a driving torque TDSSTLE, and at a step S204 the obtained driving torque TDSTLE is set to the desired driving torque TDSCMD.

Then, the processing returns to the flowchart of FIG. 16, and the steps S109 and S110 are executed to calculate the desired engine output torque TECMD based on the determined desired driving torque TDSCMD, and the desired throttle valve opening TH based on the desired engine output torque TECMD, followed by terminating the processing.

If the stall condition has become unsatisfied after the flag FSTLE was set to "1" (step S107), that is, a condition of VP≠0 or a condition of the brake system not being operated is satisfied (step S101), it is determined that a vehicle-starting operation has been carried out during the control of decreasing the stalling rotational speed, and then the processing proceeds to the step S111 to set and start the timer tSTLE.

Figure 20:
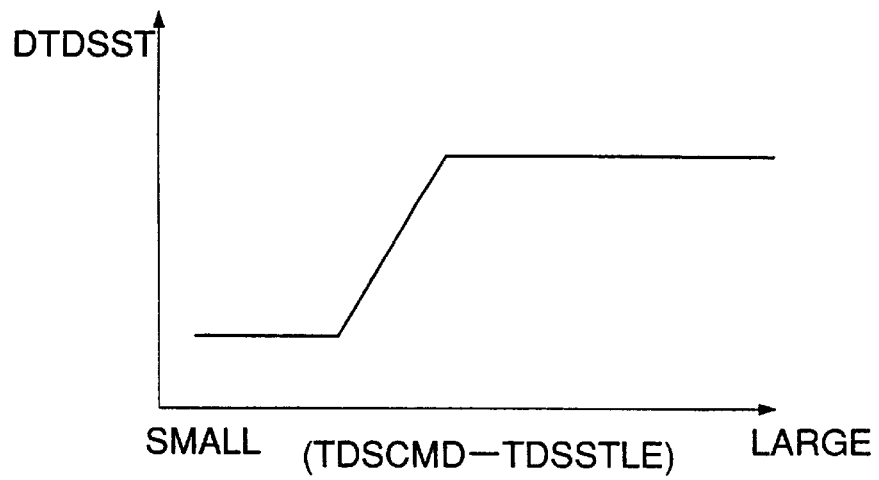
FIG. 20 shows a table for determining a torque increment DTDSST according to (TDSCMD-TDSSTLE)

Then, if it is determined at the step S112 that the flag FSTLE is equal to "1", the processing proceeds to a step S113, wherein control is made to increase the present driving torque TDSSTLE which has been controlled or decreased by the stalling rotational speed-decreasing control, to the desired driving torque TDSCMD. More specifically, the present driving torque TDSSTLE(n) is calculated by the use of the following equation (18):

$$TDSSTLE(n) = TDSSTLE(n-1) + DTDSST \quad (18)$$

where DTDSST represents a torque increment, which is determined from a table shown in FIG. 20 according to (TDSCMD−TDSSTLE). TDSCMD represents the desired driving torque as noted above, and the initial value of TDSSTLE is set to a value of the driving torque obtained immediately before the execution of the step Then, at a step S114, it is determined whether or not TDSSTLE<TDSCMD holds, and if TDSSTLE<TDSCMD holds, the processing proceeds to a step S115, wherein the driving torque TDSSTLE is set to the desired driving torque TDSCMD. Then, at a step S117, the integral term I is set to "0", followed by executing the steps S109 and S110, whereby the throttle valve opening θTH is controlled such that the present driving torque TDSSTLE which has been controlled or decreased by the stalling rotational speed-decreasing control is progressively increased toward the desired driving torque TDSCMD. Then, the processing is terminated.

On the other hand, if it is determined at the step S114 that TDSSTLE<TDSCMD does not hold, it is determined that the present engine output torque TDSSTLE decreased by the stalling rotational speed-decreasing control has been restored to the desired engine output torque TECMD, and then at the step S116 the flag FSTLE is set to "0", followed by executing the steps S117 to S110.

If AP≦0 degrees holds at the step S102 when the stall condition is satisfied, i.e., the vehicle speed VP is zero, the brake switch 24 is on, i.e. the brake system of the vehicle is operated, and at the same time the shift position of the automatic transmission 30 is set to a position other than the neutral (N) position or the parking (P) position, it is determined that the accelerator pedal has been returned from its stepped-on position during the stalling rotational speed-decreasing control. Also on this occasion, the processing proceeds through the steps S111 and S112 to execute the steps S113 et seq. Also when NE≦NESTLE holds at the step S104, the stalling rotational speed-decreasing control need not be executed, and similarly to the above, the steps S111, S112 and S113 et seq. are executed.

The operation of the present embodiment performed by executing the above described control will now be explained with reference to FIGS. 21A to 21D showing changes in various parameters obtained by the control of FIGS. 16 and 17.

As shown in FIGS. 21A to 21D, when a condition that the vehicle speed VP is zero, the brake switch 24 is on, i.e., the brake system of the vehicle is operated, and at the same time the shift position of the automatic transmission 30 is set to a position other than the neutral (N) position or the parking (P) position is satisfied (step S101), AP>0 degrees holds (step S102), NE>NESTLE holds (step S102), and at the same time the predetermined time period tSTLE has elapsed (step S105), it is determined that the stall condition is satisfied.

Upon the satisfaction of the stall condition, the stalling rotational speed-decreasing control is carried out by decreasing the throttle valve opening θTH to a predetermined opening and then feedback-controlling the same so that the engine rotational speed NE is held at the value NEST corresponding to the accelerator pedal opening AP (FIG. 21B). Thus, the engine rotational speed NE is controlled to decrease to the rotational speed NEST lower than the stalling rotational speed NESTLE.

When a vehicle-starting operation is carried out, e.g., the brake is released (FIG. 21D), during the stalling rotational speed-decreasing control, the same control is terminated, and then the throttle valve opening θTH is controlled such that the present driving torque TDSSTLE decreased by the stalling rotational speed-decreasing control is progressively increased to the desired driving torque TDSCMD corresponding to the accelerator pedal opening AP (FIGS. 21A and 21B).

As described above, according to the present embodiment, when the vehicle is in a stall state, the desired driving torque TDSCMD is calculated from the difference DNEST between the desired rotational speed NEST corresponding to the accelerator pedal position AP and the actual engine rotational speed NE, and the desired engine output torque TECMD is calculated based on the desired driving torque TDSCMD, to thereby control the throttle valve opening θTH such that the engine rotational speed NE reaches the desired rotational speed lower than the stalling rotational speed NESTLE. As a result, the amount of intake air supplied to the engine 1 is properly controlled to reduce the engine output torque so as to protect the automatic transmission 30 without impairing the catalytic converter due to irregular combustion of the engine 1 or the like.

Further, once a vehicle-starting operation has been carried out during the stalling rotational speed-decreasing control, the same control is terminated, and then the throttle valve opening θTH is carried out such that the present driving torque TDSSTLE decreased by the stalling rotational speed-decreasing control is progressively increased to the desired driving torque TDSCMD. As a result, the driving force of the vehicle can be smoothly controlled to a value corresponding to the accelerator pedal position AP, i.e., a value required by the driver.

As described above, according to the present invention, the output torque from the engine can be reduced for protection of the automatic transmission when the vehicle is in a stall state, without impairing the catalytic converter due to irregular combustion of the engine or the like.

What is claimed is:

1. In an improved control system for a vehicle, the control system having operating means operable by a driver of said vehicle for controlling a driving force of said vehicle, desired driving force-calculating means for calculating a desired driving force required by said vehicle in response to operating conditions of said vehicle including an amount of operation of said operating means, and driving force control means for controlling the driving force of said vehicle, based on the calculated desired driving force, the improvement comprising:
storage means for storing a plurality of operating conditions therein;
particular operating condition-detecting means for detecting a particular operating condition in which said vehicle is operating, said detected particular operating condition being matched with one of said plurality of operating conditions stored in said storage means; and
desired driving force-correcting means responsive to an output from said particular operating condition-detecting means, for correcting said desired driving force.

2. A control system as claimed in claim 1, including measuring means for measuring a time period over which said particular operating condition of said vehicle continues, and wherein said desired driving force-correcting means corrects said desired driving force according to said time period measured by said measuring means.

3. A control system as claimed in claim 2, wherein said desired driving force-correcting means terminates the correction of said desired driving force when said vehicle leaves said particular operating condition.

4. A control system as claimed in claim 1 or 3, wherein said particular operating condition of said vehicle is a standing condition of said vehicle.

5. A control system as claimed in claim 4, wherein said desired driving force-calculating means includes traffic congestion-traveling detecting means for detecting whether said vehicle is traveling on a road congested with traffic, and traffic congestion-dependent correction means for correcting said desired driving force in a direction of decreasing same when said traffic congestion-traveling detecting means detects that said vehicle is traveling on the road congested with traffic, said desired driving force-correcting means correcting a correction amount by which said traffic congestion-dependent correction means corrects said desired driving force in said decreasing direction to a value closer to zero.

6. A control system as claimed in claim 5, wherein said desired driving force-correcting means corrects said desired driving force to a larger value as a time period over which said standing condition continues is longer.

7. A control system as claimed in any of claims 1 to 3, wherein said particular operating condition of said vehicle includes at least one of a cruising condition of said vehicle and an accelerating condition of said vehicle in which said vehicle is accelerated to a degree corresponding to a degree of accelerating intention of said driver.

8. A control system as claimed in claim 7, wherein said desired driving force-calculating means includes high speed degree-detecting means for detecting a degree to which traveling speed of said vehicle is high, and high speed degree-dependent correction means for correcting said desired driving force in a direction of increasing same, according to said degree detected by said high speed degree-detecting means, said desired driving force-correcting means correcting a correction amount by which said high speed degree-dependent correction means corrects said desired driving force in said increasing direction to a value closer to zero.

9. A control system as claimed in claim 8, wherein said desired driving force-correcting means corrects said desired driving force to a smaller value as a time period over which said cruising condition continues is longer.

10. A control system as claimed in claim 8, wherein said desired driving force-correcting means corrects said desired driving force to a larger value as said degree of accelerating intention of said driver is higher.

11. A control system as claimed in claim 1, wherein said vehicle has an automatic transmission, said control system including:
speed reduction ratio control means for controlling a speed reduction ratio of said automatic transmission according to said amount of operation of said operating means and traveling speed of said vehicle;
first desired driving force-changing means for changing said desired driving force by changing a kind or value of at least one parameter used in control of said speed reduction ratio by said speed reduction ratio control means; and
second driving force-changing means for changing said desired driving force by changing a kind or value of at least one parameter not affecting said control of said speed reduction ratio by said speed reduction ratio control means;
said first desired driving force-changing means or said second desired driving force-changing means changing said desired driving force in response to said output from said particular operating condition-detecting means.

12. A control system as claimed in claim 11, wherein said first desired driving force-changing means changes said desired driving force in a direction of decreasing same.

13. A control system as claimed in claim 11 or 12, wherein said second desired driving force-changing means includes at least one of high speed degree-dependent changing means for changing said desired driving force according to a degree to which traveling speed of said vehicle is high, and slope traveling-dependent changing means for changing said desired driving force according to a gradient of a slope on which said vehicle is traveling.

14. In an improved control system for a vehicle having an internal combustion engine installed therein, the control system having operating means operable by a driver of said vehicle, for controlling a driving force of said vehicle, desired driving force-calculating means for calculating a desired driving force required by said vehicle in response to operating conditions of said vehicle including an amount of operation of said operating means, and output torque control means for controlling output torque from said engine to a desired output torque based on the calculated desired force, the improvement comprising:
storage means for storing a plurality of operating conditions therein;
particular operating condition-detecting means for detecting a particular operating condition in which said vehicle is operating, said detected particular operating condition being matched with one of said plurality of operating conditions stored in said storage means; and
desired torque-setting means responsive to an output from said particular operating condition-detecting means, for setting said desired output torque to a value for decreasing rotational speed of said engine to a predetermined value.

15. A control system as claimed in claim 14, wherein said particular operating condition of said vehicle is a predetermined stall state of said vehicle.

16. A control system as claimed in claim 15, wherein said vehicle has a brake system, an accelerator pedal, and an automatic transmission, said predetermined stall state of said vehicle is a condition that a state in which traveling speed of said vehicle is zero, said brake system is operated, said accelerator pedal is stepped on, the rotational speed of said engine exceeds a predetermined value, and at the same time said automatic transmission has a shift position thereof set to a position other than a position for standing of said vehicle, has continued over a predetermined time period.

17. A control system as claimed in claim 14, wherein said vehicle has an accelerator pedal, said desired output torque-setting means setting said desired output torque to a value corresponding to an amount of stepping-on of said accelerator pedal.

18. A control system as claimed in claim 16, wherein said desired output torque-setting means sets said desired output torque to a value corresponding to an amount of stepping-on of said accelerator pedal.

19. A control system as claimed in claim 17 or 18, wherein said desired output torque-setting means sets said desired output torque to a value for holding the rotational speed of said engine at a predetermined idling speed corresponding to said amount of stepping-on of said accelerator pedal.

20. A control system as claimed in any of claims 15, 16 and 18, wherein if an operation of starting said vehicle is carried out during control of said output torque by said output torque control means when said vehicle is in said predetermined stall state, said output torque control means terminates said control of said output torque and controls an amount of intake air supplied to said engine to a value required by said driver.

21. A control system as claimed in 19, wherein if an operation of starting said vehicle is carried out during control of said output torque by said output torque control means when said vehicle is in said predetermined stall state, said output torque control means terminates said control of said output torque and controls an amount of intake air supplied to said engine to a value required by said driver.

\* \* \* \* \*